(12) United States Patent
Brown et al.

(10) Patent No.: US 12,152,569 B2
(45) Date of Patent: Nov. 26, 2024

(54) SMA HAPTIC ASSEMBLY

(71) Applicant: CAMBRIDGE MECHATRONICS LIMITED, Cambridge (GB)

(72) Inventors: Andrew Benjamin Simpson Brown, Cambridge (GB); Marc-Sebastian Scholz, Cambridge (GB); Andreas Flouris, Cambridge (GB); Nicolas Heijne, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 17/793,709

(22) PCT Filed: Jan. 25, 2021

(86) PCT No.: PCT/GB2021/050159
§ 371 (c)(1),
(2) Date: Jul. 19, 2022

(87) PCT Pub. No.: WO2021/148814
PCT Pub. Date: Jul. 29, 2021

(65) Prior Publication Data
US 2023/0052986 A1  Feb. 16, 2023

(30) Foreign Application Priority Data
Jan. 24, 2020  (GB) ..................................... 2001070

(51) Int. Cl.
*F03G 7/06*  (2006.01)
*G06F 3/01*  (2006.01)
(52) U.S. Cl.
CPC ......... *F03G 7/06143* (2021.08); *G06F 3/016* (2013.01)

(58) Field of Classification Search
CPC .......... F03G 7/06; F03G 7/061; F03G 7/0614; F03G 7/06143; F03G 7/065; G06F 3/016; G03B 2205/0076
See application file for complete search history.

(56) References Cited

U.S. PATENT DOCUMENTS

2010/0212312 A1  8/2010  Rudduck
2013/0154984 A1*  6/2013  Gondo .................... G06F 3/041
                                                                    345/173
(Continued)

FOREIGN PATENT DOCUMENTS

JP    2016145582 A  *  8/2016  ............... F03G 7/06
WO   WO 2019097848       5/2019

OTHER PUBLICATIONS

GB Search Report and Examination Report dated Oct. 20, 2020 of GB Application 2001070.8.
(Continued)

*Primary Examiner* — Loren C Edwards
(74) *Attorney, Agent, or Firm* — Van Hoven PC; Stefan D. Osterbur; Joshua Van Hoven

(57) ABSTRACT

An SMA haptic assembly comprises relatively movable first and second parts and a length of SMA wire, the ends of which are connected to the first part or second part, wherein the first and second parts comprise at least one contact portion making contact with the length of SMA wire on opposite sides of the length of SMA wire and relatively positioned so as to guide the length of SMA wire along a tortuous path such that the first and second parts are driven in opposite directions along a movement axis on contraction of the length of SMA wire. The at least one contact portion of one or both of the first and second parts is formed from sheet material that is shaped to guide the path of the SMA (Continued)

wire in contact therewith, thereby reducing the overall thickness and simplifying manufacture.

20 Claims, 18 Drawing Sheets

(56) References Cited

U.S. PATENT DOCUMENTS

2015/0369222 A1  12/2015  Fujii et al.
2017/0284379 A1  10/2017  Krumpelman

OTHER PUBLICATIONS

International Search Report and Written Opinion of PCT/GB2020/050159 dated Feb. 23, 2021.

* cited by examiner

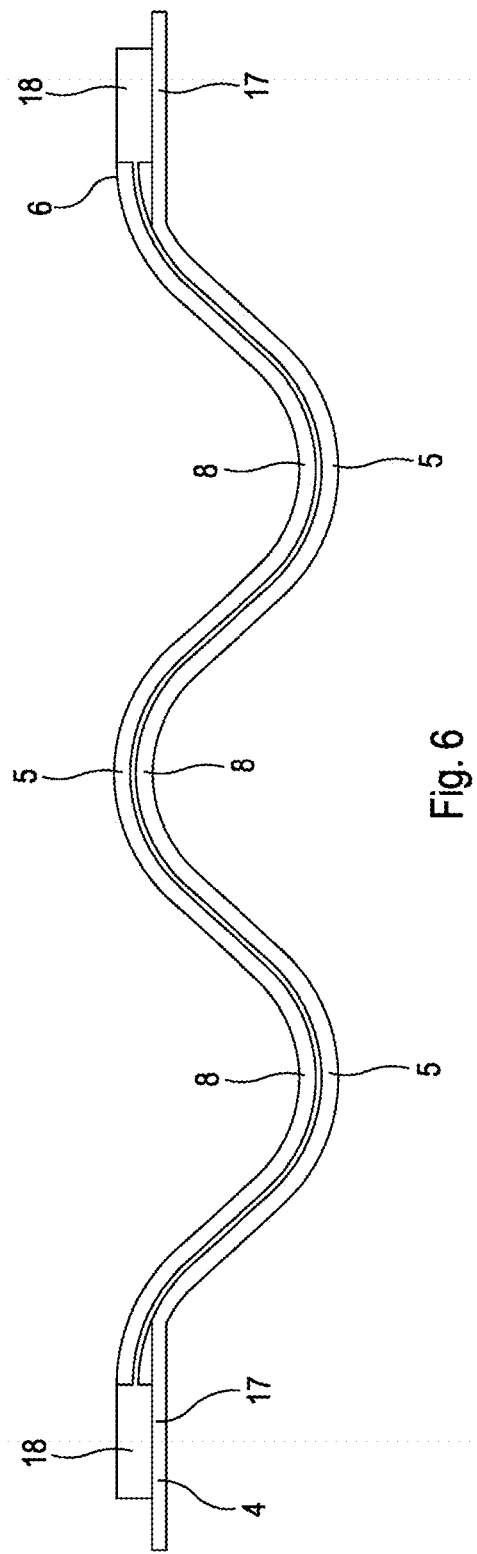

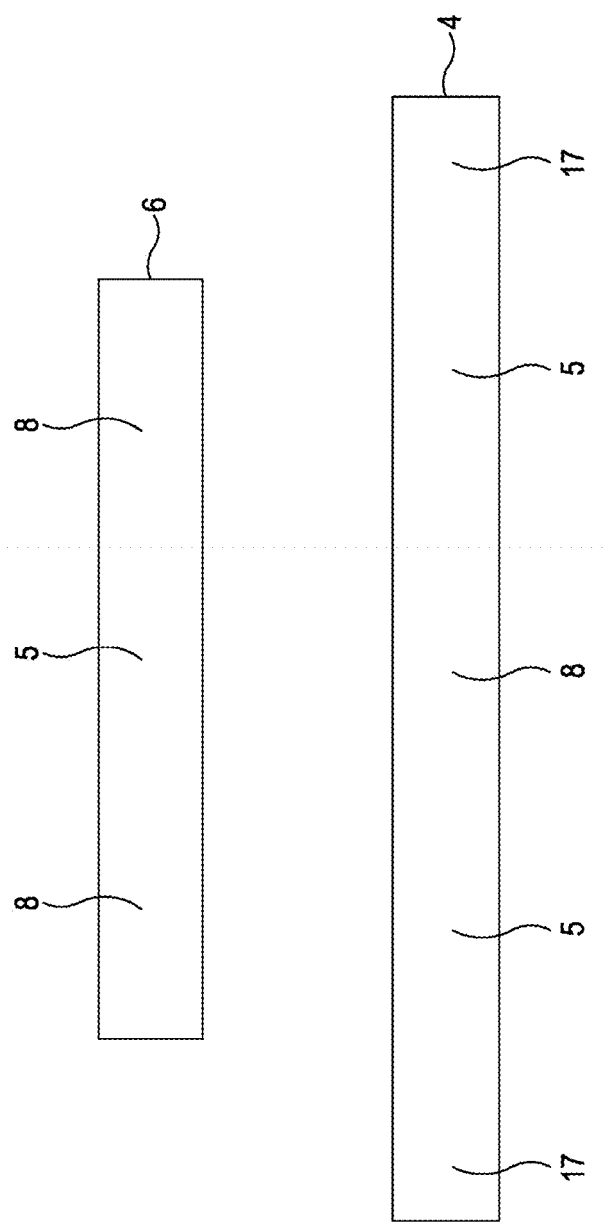

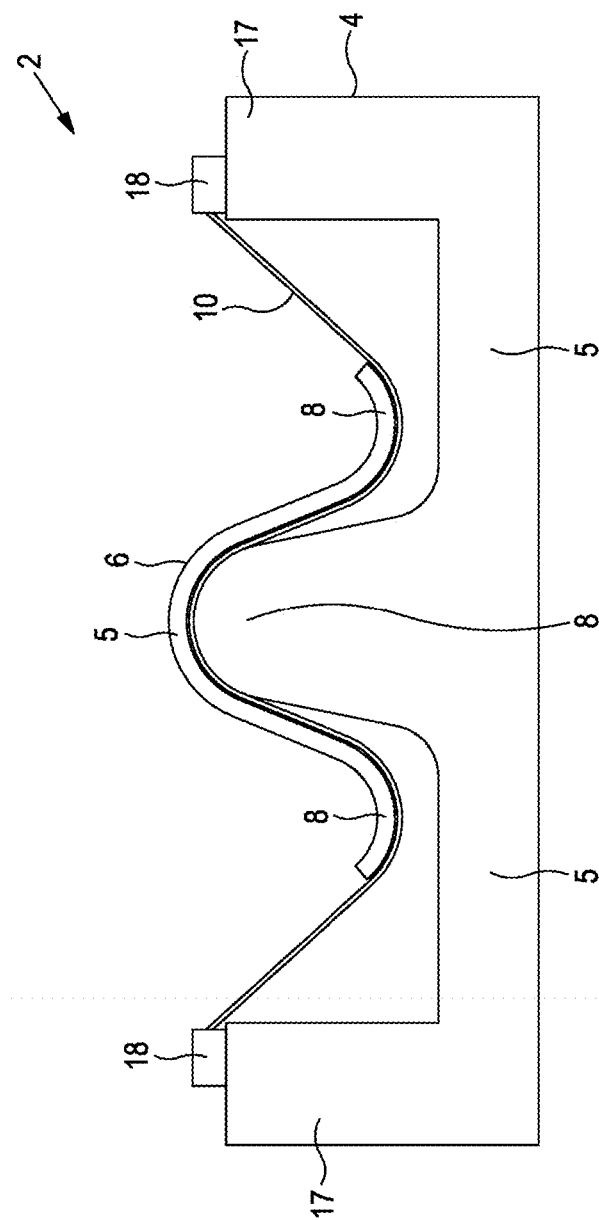

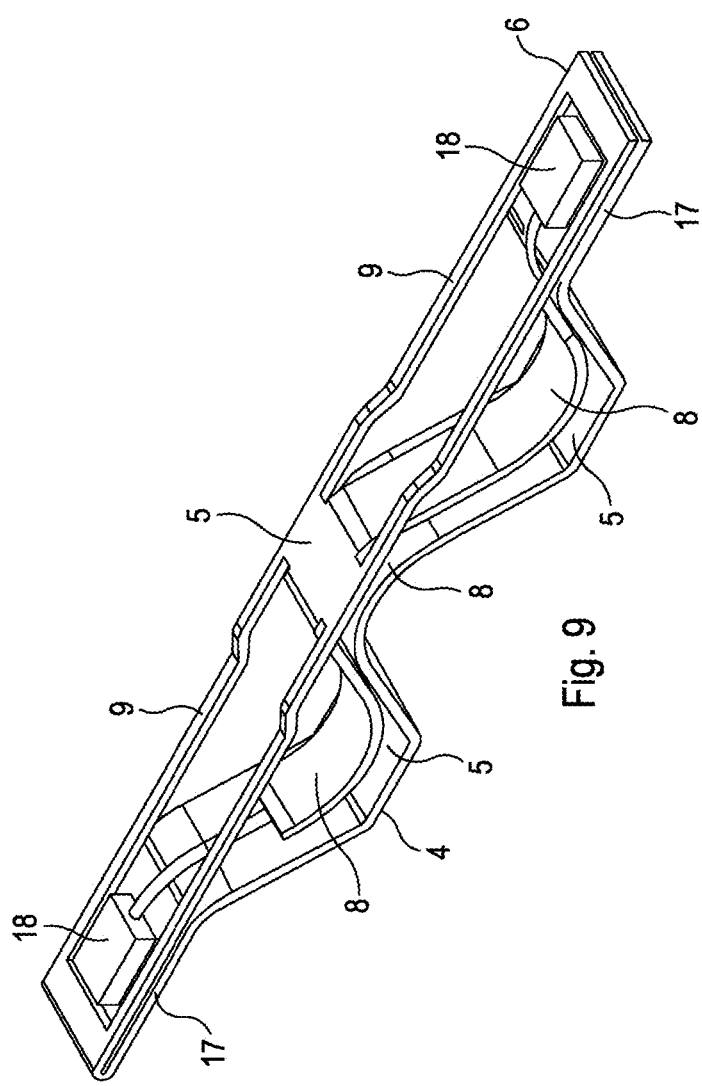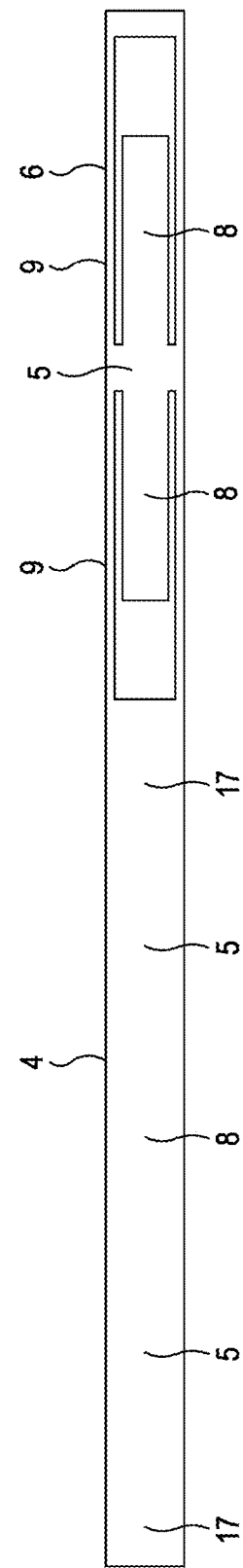

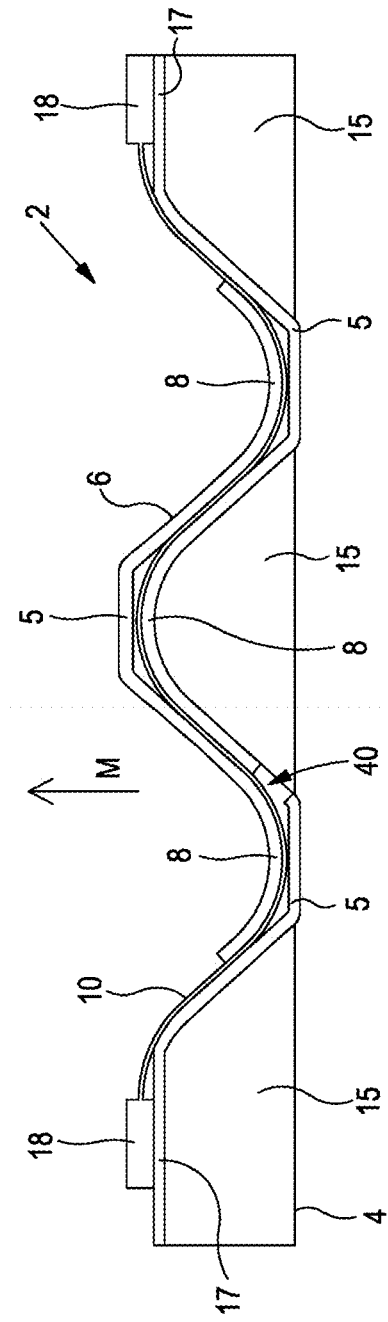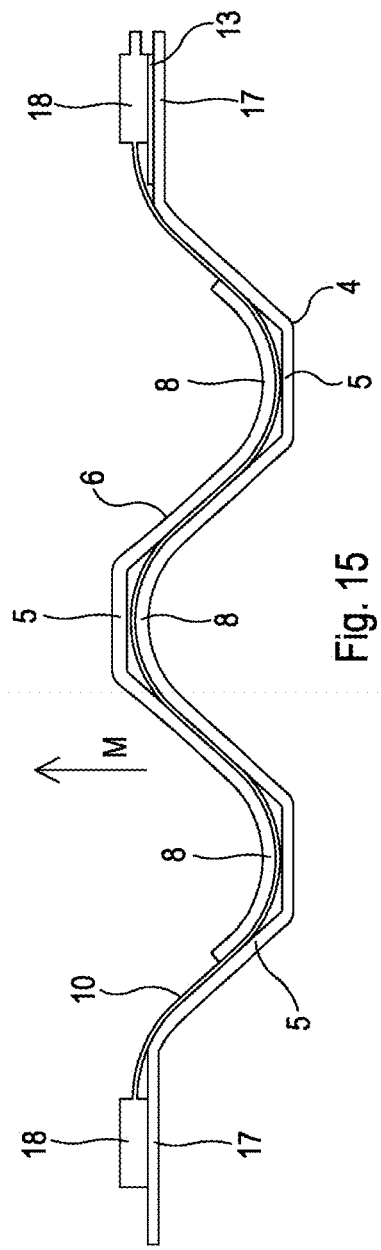

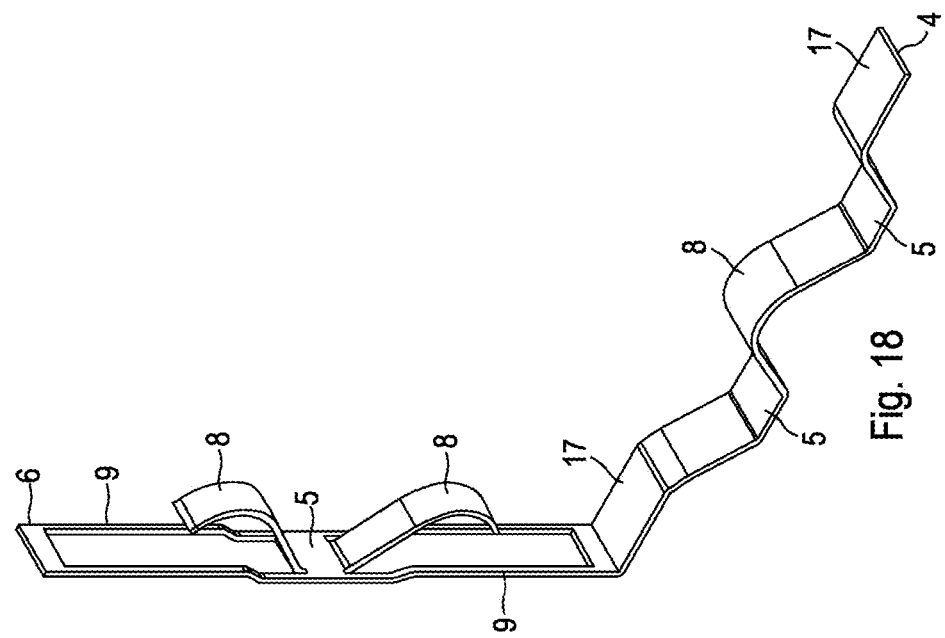
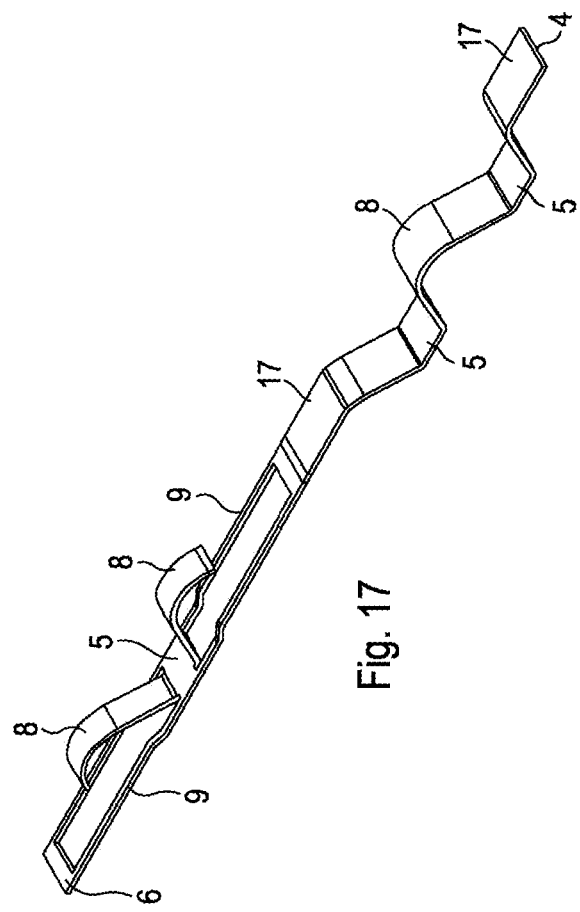

SMA HAPTIC ASSEMBLY

CROSS-REFERENCE TO RELATED APPLICATIONS

This application is a national stage application under 35 U.S.C. § 371 of International Application No. PCT/GB2021/050159, filed Jan. 25, 2021, which claims priority of GB Patent Application No. 2001070.8, filed Jan. 24, 2020, the disclosures of each of which are hereby incorporated by reference herein in their entireties.

The present invention relates to actuators that use shape memory alloy (SMA) wires to provide relative movement between two components, and methods of manufacture thereof. In particular, it relates to such actuators at least partly formed from sheet material.

SMA actuators are known for use in handheld electronic devices, such as cameras and mobile phones. In particular, they can be used to provide haptic functionality for tactile feedback, for example in response to a user selecting a particular area of a screen or pressing a button. Such actuators typically function by using the contraction of an SMA wire to cause relative motion of two components. The SMA wire is in contact with parts of two opposing bodies which are forced in opposite directions due to the change in length of the SMA wire as it contracts. The tactile feedback may be in the form of a 'click' sensation, vibrations, or similar.

The space available for components inside handheld or mobile devices is at a premium in order to reduce their size and weight, or to be able to fit additional components and functionality into the device. Therefore, it is desirable to provide an SMA haptic assembly that has reduced size, without affecting the functionality of the assembly. In particular, it is desirable to provide such an assembly without increasing manufacturing and assembly costs. It is an aim of the present invention to provide such an assembly, and methods for manufacturing such an assembly.

According to a first aspect of the present invention, there is provided an SMA haptic assembly comprising first and second parts that are movable relative to each other along a movement axis, and a length of SMA wire, each of the ends of the length of SMA wire being connected to the first part or second part, wherein the first part comprises at least one contact portion making contact with the length of SMA wire on a first side of the length of SMA wire along the movement axis, the second part comprises at least one contact portion making contact with the length of SMA wire on a second side of the length of SMA wire along the movement axis, opposite to the first side, the at least one contact portion of the first part and the at least one contact portion of the second part being relatively positioned so as to guide the length of SMA wire along a tortuous path such that the first and second parts are driven in opposite directions along the movement axis on contraction of the length of SMA wire, and the at least one contact portion of one of the first and second parts is formed from sheet material that is shaped to guide the path of the SMA wire in contact therewith.

By forming the contact portions of one of the first and second parts from sheet material, the thickness of the part can be reduced, thereby reducing the size of the assembly overall. In addition, sheet material can be stamped or chemically etched, rather than using techniques such as machining or injection moulding that are often used to produce parts for haptic assemblies. This reduces the complexity and cost of the materials and manufacturing methods used to produce the SMA haptic assembly.

In some embodiments, the one of the first and second parts further comprises support portions to which the ends of the length of SMA wire are connected and at least one connection portion which connects the at least one contact portion and the support portions. Connecting the length of SMA wire to the part formed from sheet material means that both ends are attached to the same part, reduces forces between the two parts in directions other than in the movement direction, thereby reducing the chance of relative motion in undesirable directions, and reducing stress/strain on any suspension mechanism between the two parts.

In some embodiments, the at least one contact portion and the at least one connection portion are integrally formed from said sheet material. In some embodiments, the support portions are also integrally formed from said sheet material. These embodiments increase the proportion of the part made from sheet material, increasing the advantages in saved material and device size.

In some embodiments, the sheet material has at least one gap that electrically disconnects the two support portions. This is advantageous particularly when the sheet material is a metal, because it ensures the two support portions are electrically isolated from each other, thereby preventing a short circuit across the length of SMA wire.

In some embodiments, the one of the first and second parts comprises plural contact portions and at least one connection portion connecting the contact portions together. Including plural contact portions increases the force applied between the parts by the length of SMA wire without increasing the height of the assembly along the movement axis.

In some embodiments, the plural contact portions and the at least one connection portion are integrally formed from said sheet material. This increases the proportion of the part made from sheet material, increasing the advantages in saved material and device size.

In some embodiments, the at least one connection portion extends between the portions connected thereby along a lateral side of the length of SMA wire in a direction normal to the movement axis. This reduces the size of the assembly because the connection portion and the length of SMA wire can overlap in a direction parallel to the movement axis, which would not be possible if the connection portion were disposed on the first or second side of the length of SMA wire.

In some embodiments, the connection portion is planar. This means that the connection portion can be disposed so as to have the minimum height necessary to perform its function.

In some embodiments, the at least one connection portion extends between the portions connected thereby around the length of SMA wire on the first side of the length of SMA wire along the movement axis on which at least one contact portion makes contact with the length of SMA wire. This can be advantageous because the length of SMA wire does not pass through the one of the parts, which can simplify assembly of the haptic assembly.

In some embodiments, the at least one connection portion provides a limit on relative movement of the first and second parts in an opposite direction to that in which the first and second parts are driven on contraction of the length of SMA wire by contact with the length of SMA wire. This prevents damage to the length of SMA wire that could result due to overextension of the length of SMA wire.

In some embodiments, the SMA haptic assembly further comprises at least one flexure, extending from the one of the first and second parts to the other of the first and second parts and connected thereto, the flexure being arranged to guide relative movement of the first and second parts along the movement axis. Flexures can prevent the two parts moving in unintended directions relative to one another, and can provide a restoring force to return the parts to their resting relative positions after actuation.

In some embodiments, the flexure is integrally formed from the sheet material. This provides the advantage that a separate component does not need to be provided and attached to the assembly, thereby simplifying manufacture and assembly.

In some embodiments, the one of the first and second parts comprises plural contact portions and further comprises at least one connection portion connecting the contact portions together, and the or each flexure extends from the one of the first and second parts to the other of the first and second parts along a lateral side in a direction normal to the movement axis. This reduces the size of the assembly because the flexure and the length of SMA wire can overlap in a direction parallel to the movement axis, which would not be possible if the flexure were disposed on the first or second side of the length of SMA wire.

In some embodiments, the one of the first and second parts further comprises at least one endstop integrally formed from the sheet material and providing a limit on relative movement of first and second parts. Endstops can prevent damage to the assembly that could result due to overextension of the length of SMA wire, or parts moving too close to or far from one another.

In some embodiments, the endstop provides a limit on relative movement of first and second parts in an opposite direction to that in which the first and second parts are driven on contraction of the length of SMA wire. This can prevent damage from overextension of the length of SMA wire.

In some embodiments, the one of the first and second parts comprises plural contact portions and further comprises at least one connection portion connecting the contact portions together, and the endstop extends from the at least one connection portion to a position where it provides a limit on relative movement of first and second parts by contact with the other of the first and second parts. By having the endstop extend from the connection portion, it can be formed integrally with the connection portion, removing the need to provide a further separate component and reducing manufacturing complexity.

In some embodiments, the material is metal. Metal has advantageous physical properties such as high strength, and can also be easily stamped or etched to manufacture the parts.

In some embodiments, the SMA haptic assembly further comprises insulating material that electrically insulates the at least one contact portion of the one of the first and second parts from the length of SMA wire. Where the material is metal, a short circuit could occur through the parts, and providing insulation can prevent this from occurring.

In some embodiments, the length of SMA wire and/or the at least one contact portion of the one of the first and second parts is coated with said insulating material. Insulating coatings are readily available and methods for applying them to wire or sheet materials are well-know.

In some embodiments, the one of the first and second parts further comprises a support portion to which an end of the length of SMA wire is connected by a connection element that holds the SMA wire. In some embodiments, the connection element is a crimp element. Crimp elements are advantageous because they are easy to assemble, and can be used to provide electrical connection to the length of SMA wire as well as mechanical attachment.

In some embodiments, the crimp element is integrally formed from said sheet material. This is advantageous in reducing the component count and thereby simplifying manufacture and assembly of the SMA haptic assembly.

In some embodiments, the SMA haptic assembly further comprises electrically insulating material provided between the connection element and the support portion. This is advantageous particularly when the sheet material is a metal, because it ensures the two support portions are electrically isolated from each other, thereby preventing a short circuit across the length of SMA wire.

In some embodiments, the sheet of material is connected to a body of electrically insulating material. This can allow the components of the assembly to be mechanically connected together while avoiding a short circuit between the ends of the length of SMA wire through any component of the assembly.

In some embodiments, the at least one contact portion of the one of the first and second parts is curved. This increases the area of contact between the length of SMA wire and the contact portion, thereby reducing the pressure on the wire and the chance of damage due to abrasion.

In some embodiments, the first and second parts are integrally formed from a single sheet of material. This has the advantage that the first and second parts can be formed together in a single step, and alignment of the two parts with one another during assembly is simplified.

In some embodiments, the at least one contact portion of the other of the first and second parts is also formed from sheet material that is shaped to guide the path of the SMA wire in contact therewith, optionally wherein the at least one contact portion of the other of the first and second parts is curved. Forming the contact portions of both parts from sheet material further reduces the thickness of the assembly as well as the complexity and cost of the materials and manufacturing methods used to produce the SMA haptic assembly.

In some embodiments, the one of the first and second parts further comprises support portions to which the ends of the length of SMA wire are connected and at least one connection portion which connects the at least one contact portion and the support portions, the at least one contact portion, the at least one connection portion and the support portions of the first part are integrally formed from said sheet material, and the at least one connection portion of the first part extends between the at least one contact portions and the support portions along a lateral side of the length of SMA wire in a direction normal to the movement axis. This reduces the size of the assembly because the connection portion and the length of SMA wire can overlap in a direction parallel to the movement axis, which would not be possible if the connection portion were disposed on the first or second side of the length of SMA wire.

In some embodiments, the one of the first and second parts further comprises support portions to which the ends of the length of SMA wire are connected and at least one connection portion which connects the at least one contact portion and the support portions, the at least one contact portion, the at least one connection portion and the support portions of the first part are integrally formed from said sheet material, and the at least one connection portion of the first part extends between the portions connected thereby around the length of SMA wire on the first side of the length of SMA wire along the movement axis on which at least one contact portion makes contact with the length of SMA wire. This can be advantageous because the length of SMA wire does not pass through the one of the parts, which can simplify assembly of the haptic assembly.

In some embodiments, the other of the first and second parts comprises plural contact portions and at least one connection portion connecting the contact portions together, the plural contact portions and the at least one connection portion of the second part are integrally formed from said sheet material, and the at least one connection portion of the second part extends between the contact portions along a lateral side of the length of SMA wire in a direction normal to the movement axis. This further reduces the size of the assembly because the connection portion and the length of SMA wire can overlap in a direction parallel to the movement axis, which would not be possible if the connection portion were disposed on the first or second side of the length of SMA wire.

In some embodiments, the other of the first and second parts comprises plural contact portions and at least one connection portion connecting the contact portions together, the plural contact portions and the at least one connection portion of the second part are integrally formed from said sheet material, and the at least one connection portion of the second part extends between the contact portions around the length of SMA wire on the second side of the length of SMA wire along the movement axis on which at least one contact portion makes contact with the length of SMA wire. This can be advantageous because the length of SMA wire does not pass through the one of the parts, which can simplify assembly of the haptic assembly.

According to a second aspect of the invention, there is provided a method of manufacture of an SMA haptic assembly according to the first aspect of the invention.

In some embodiments, the method of manufacture of an SMA haptic assembly comprises connecting the length of SMA wire to the first part, and assembling the second part with the first part. Where the connection portion of at least one of the parts extends on the first or second side, the length of SMA wire does not need to be threaded through either part, thereby simplifying the assembly procedure.

In some embodiments, the method of manufacture of an SMA haptic assembly comprises providing a planar form of the first part made from sheet material, connecting the length of SMA wire to the first part, shaping the sheet material to form the first part, and assembling the second part with the first part. Where the connection portion of the first part extends on the first side, the part can be formed with the length of SMA wire in situ. This can simplify manufacture because the length of SMA wire can be attached to the flat sheet material, which may be easier to handle than the formed first part.

In some embodiments, the method of manufacture of an SMA haptic assembly comprises providing a planar form of the first part made from sheet material, connecting the length of SMA wire to the first part, assembling a planar form of the second part made from sheet material with the planar form of the first part, and shaping the sheet material to form the first and second parts. Where the connection portions of the first and second parts extend on the first and second sides, both parts can be formed together with the length of SMA wire in situ. This can simplify manufacture because the length of SMA wire can be attached to the flat sheet material, which may be easier to handle than the formed first part, and because both parts can be formed together to ensure they have complimentary shapes.

In some embodiments, assembling the planar forms comprises urging the planar forms into contact with each other, wherein the planar forms are provided with recesses to accommodate the length of SMA wire when the planar forms of the first and second parts are in contact with each other. Providing recesses prevents the length of SMA wire from being compressed between the parts as they are formed, thereby reducing the chance of damaging the length of SMA wire when the parts are formed with the length of SMA wire in situ.

In some embodiments, the sheet material comprises a laminate material. In some embodiments, the method of manufacture of the SMA haptic assembly 2 comprises (selectively) delaminating such a material.

Embodiments of the invention will now be described by way of non-limitative example with reference to the accompanying drawings, in which:

FIG. 6 is a side view of an SMA haptic assembly similar to that of FIG. 5, but where both connection portions are curved;

FIG. 7 is a plan view of the two parts of the SMA haptic assemblies of FIGS. 5 and 6;

FIG. 8 is a side view of an SMA haptic assembly where only one part is formed from sheet material;

FIG. 9 is a perspective view of an SMA haptic assembly where the first and second parts are integrally formed from a single sheet of material;

FIG. 10 is a plan view of the integrally-formed first and second parts of the SMA haptic assembly of FIG. 11;

FIG. 14 is a side view of an SMA haptic assembly having at least one gap that electrically disconnects the two support portions, and wherein the sheet of material is connected to a body of electrically insulating material;

FIG. 15 is a side view of an SMA haptic assembly comprising electrically insulating material provided between the connection element and the support portion;

FIG. 17 is a perspective view showing an intermediate step of a method of manufacturing an SMA haptic assembly wherein the first and second parts are integrally formed from sheet material;

FIG. 18 is a further perspective view showing an intermediate step of a method of manufacturing an SMA haptic assembly wherein the first and second parts are integrally formed from sheet material;

SMA actuators are known for use in a variety of devices. In many applications, it is desirable to reduce the size of the SMA actuator assembly and simplify manufacture. This is particularly the case when the SMA haptic assembly is intended for use in mobile devices, where space is often at a premium. The present invention uses components formed of sheet material, for example metal, to minimise the size of the actuator beyond the height required by the SMA wire.

Figure 1:
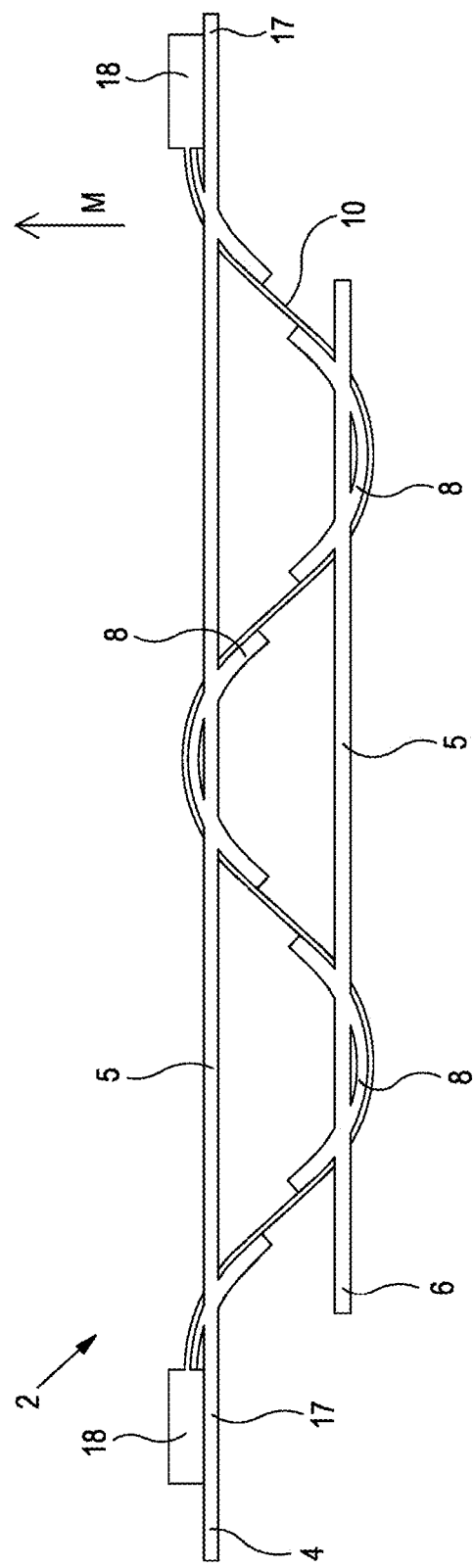
FIG. 1 is a side view of an SMA haptic assembly where both parts are formed from sheet material.

FIG. 1 shows an embodiment of an SMA haptic assembly 2 according to the present invention. The SMA haptic assembly 2 comprises first and second parts 4, 6 that are movable relative to each other along a movement axis M. The relative movement of the first and second parts 4, 6 provides the haptic effect to the user. The SMA haptic assembly 2 may be used in applications such as mobile telephones, wearable devices, cameras, computer accessories such as trackpads, media players, portable digital assistants (PDAs), or other mobile devices.

In some embodiments, the SMA haptic assembly 2 is integrated into a larger device. In some embodiments, one of the first and second parts 4, 6 may be a static part, which does not move relative to the device during actuation of the SMA haptic assembly 2, and the other of the first and second parts 4, 6 a moving part which does move relative to the device during actuation of the SMA haptic assembly 2. Alternatively, both parts 4, 6 may move during actuation.

The SMA haptic assembly 2 further comprises a length of SMA wire 10, each of the ends of the length of SMA wire 10 being connected to the first part 4 or second part 6.

The first part 4 comprises at least one contact portion 8 making contact with the length of SMA wire 10 on a first side of the length of SMA wire 10 along the movement axis M, the second part 6 comprises at least one contact portion 8 making contact with the length of SMA wire 10 on a second side of the length of SMA wire 10 along the movement axis M, opposite to the first side. In the embodiment of FIG. 1, the first part 4 has a single contact portion 8 and the second part has two contact portions 8, although more generally the first and second parts 4, 6 could be modified to have any number of contact portions 8.

The shape of the contact portions 8 can be any suitable shape to provide contact with the length of SMA wire 10. In the embodiments shown in the figures, the uppermost portion of the contact portions 8 has a curved, or wave-like shape. However, other shapes could be used. For example, the uppermost portion of the contact portions 8 may be pointed, or the uppermost portion of the contact portions 8 may be flat.

Figure 5:
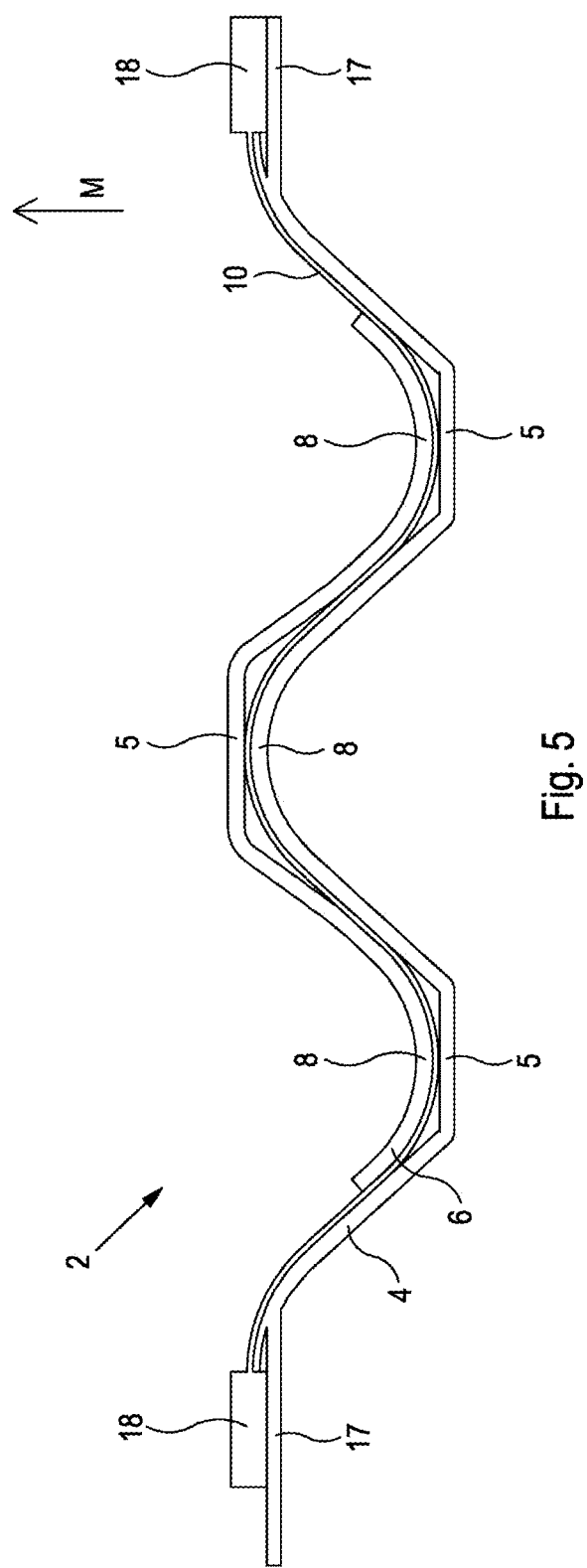
FIG. 5 is a side view of an SMA haptic assembly where both parts have connection portions extending around the length of SMA wire on a respective side of the length of SMA wire on which the contact portions of the respective parts makes contact with the length of SMA wire.

The contact portions 8 of the first and second parts 4, 6 alternate in a direction normal to the movement axis M. This means that for any contact portions 8 on either of the first and second parts 4, 6, the nearest adjacent contact portion 8 will be a contact portion 8 of the other of the first and second parts 4, 6. In some embodiments, for example as shown in FIG. 5, the contact portions 8 overlap in a direction parallel to the movement axis M. The overlapping of the contact portions 8 means that the uppermost portion of a contact portion 8 on the lower part is above the lowermost portion of the adjacent contact portion 8 of the upper part (where 'up' for this purpose is defined as being in the direction of movement of the second part 6 relative to the first part 4 on contraction of the length of SMA wire 10). However, this is not essential, and in other embodiments (such as that of FIG. 1) the contact portions 8 of the first and second parts 4, 6 may not overlap in a direction parallel to the movement axis M.

In some embodiments, the first part 4 comprises plural contact portions 8. In some embodiments, the second part comprises plural contact portions 8. Providing plural contact portions 8 on one or both of the first and second parts 4, 6 increases the total force applied by the length of SMA wire 10 between the first and second parts 4, 6 while minimising the extent of the length of SMA wire 10 along the movement axis M. In embodiments where the one of the first and second parts 4, 6 comprises plural contact portions 8, the one of the first and second parts 4, 6 further comprises at least one connection portion 5 connecting the contact portions 8 together. Where both of the first and second parts 4, 6 comprise plural contact portions 8, then both of the first and second parts 4, 6 further comprise at least one connection portion 5.

Figure 2:
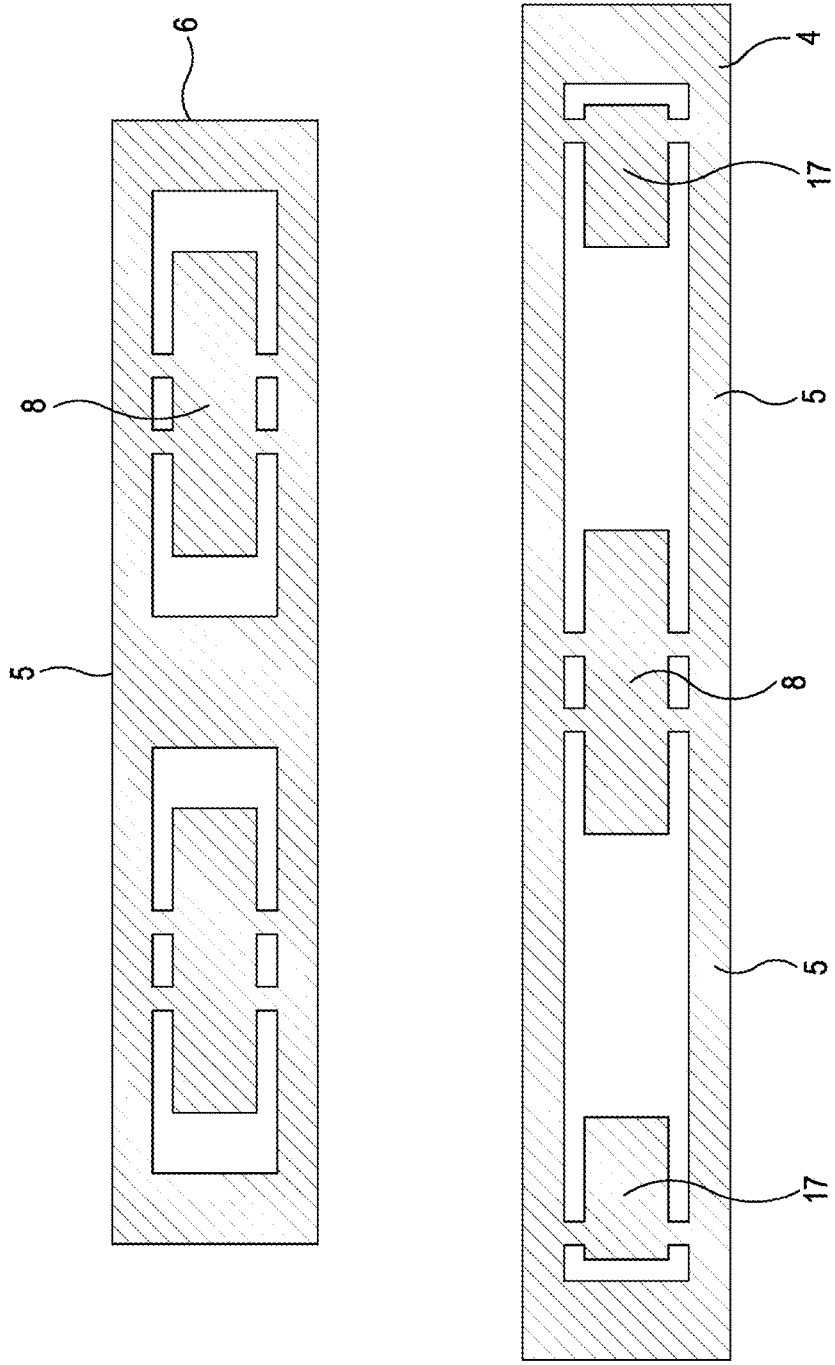
FIG. 2 is a plan view of the two parts of the SMA haptic assembly of FIG. 1.

In some embodiments, the one of the first and second parts 4, 6 further comprises support portions 17 to which the ends of the length of SMA wire 10 are connected. In general, the ends of the length of SMA wire 10 may be connected to different ones of the first and second parts 4, 6. For example, a first end of the length of SMA wire 10 may be connected to a support portion 17 forming part of one of the first and second parts 4, 6, and a second end of the length of SMA wire 10 may be connected to a support portion 17 forming part of the other of the first and second parts 4, 6. Preferably, the length of SMA wire 10 is connected at each end to respective support portions 17 forming part of the same one of the first and second parts 4, 6. Connecting both ends to the same one of the first and second parts 4, 6 reduces the force between the first and second parts 4, 6 in a direction perpendicular to the movement axis M during actuation of the SMA haptic assembly 2. This reduces strain on any suspension system, and maximises the component of the force that is applied between the first and second parts 4, 6 in the desired direction along the movement axis. In embodiments where the one of the first and second parts 4, 6 comprises support portions 17, the one of the first and second parts 4, 6 further comprises at least one connection portion 5 which connects the at least one contact portion 8 and the support portions 17.

Where at least one of the first and second parts 4, 6 comprises at least one connection portion 5, the connection portion 5 may be provided in different configurations. In some embodiments, the at least one connection portion 5 extends between the portions connected thereby along a lateral side of the length of SMA wire 10 in a direction normal to the movement axis M. Examples of this configuration are the first and second parts 4, 6 in FIG. 1 and the first part 4 of FIG. 3. FIG. 2 is a plan view of the first and second parts 4, 6 of the embodiment of FIG. 1, showing how the connection portions 5 are configured so that they will extend along the lateral sides of the length of SMA wire 10 when assembled into the complete SMA haptic assembly 2. In some embodiments, the connection portion 5 is planar, as seen in the embodiment of FIG. 1.

Figure 3:
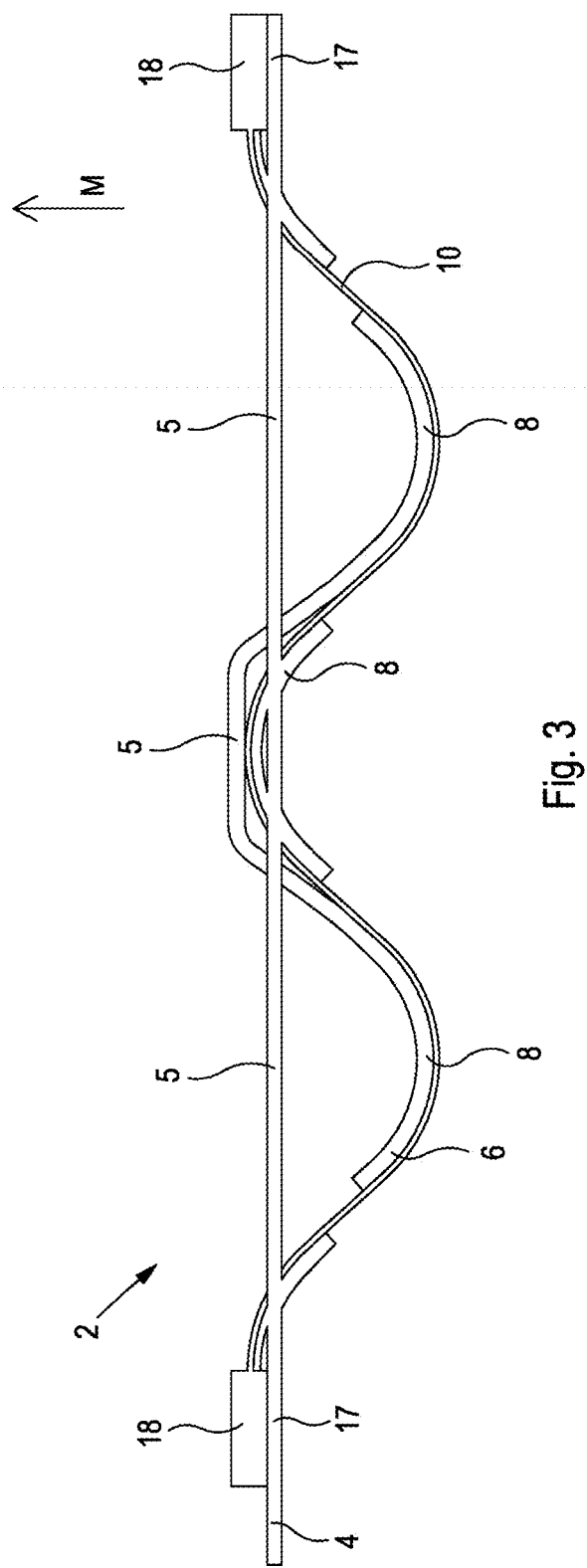
FIG. 3 is a side view of an SMA haptic assembly where one part has a connection portion extending along a lateral side of the length of SMA wire, and the other part has a connection portion extending around the length of SMA wire on the side on which the contact portions of the other part make contact with the length of SMA wire.
Figure 4:
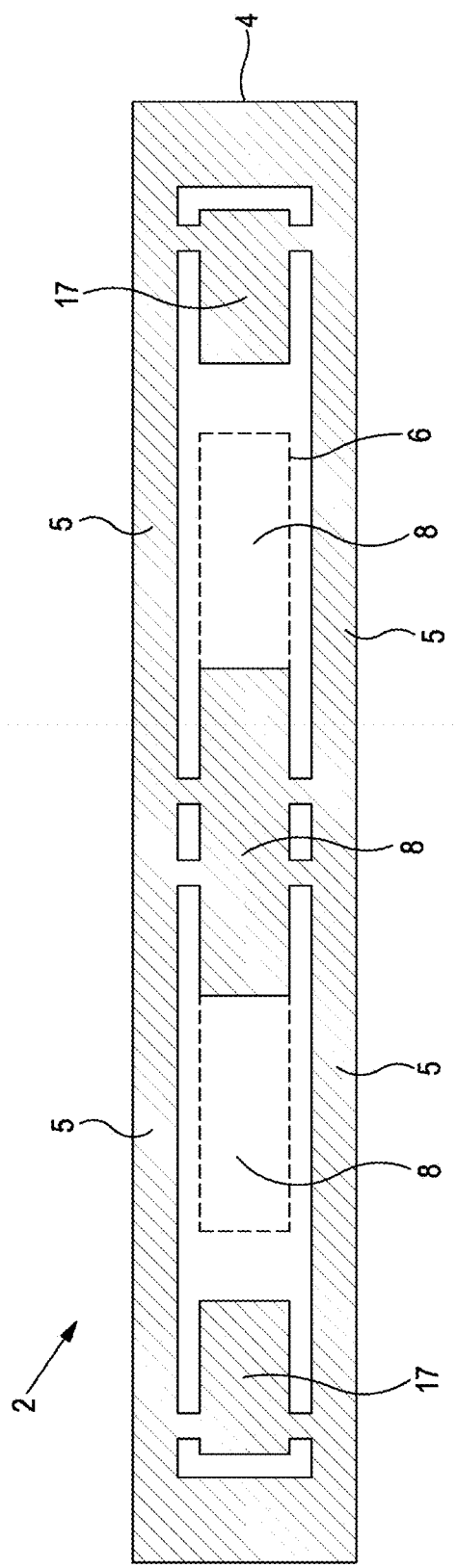
FIG. 4 is a plan view of the SMA haptic assembly of FIG. 3.

An alternative configuration of the connection portions 5 is shown in FIG. 3 and FIG. 5. In some embodiments, the at least one connection portion 5 of the part extends between the portions connected thereby around the length of SMA wire 10 on a side of the length of SMA wire 10 along the movement axis M on which at least one contact portion 8 of the part makes contact with the length of SMA wire 10. For example, where the first part 4 comprises at least one connection portion 5, the at least one connection portion 5 of the first part 4 may extend between the portions connected thereby around the length of SMA wire 10 on the first side of the length of SMA wire 10 along the movement axis M on which the at least one contact portion 8 of the first part 4 makes contact with the length of SMA wire 10. Where the second part 6 comprises at least one connection portion 5, the at least one connection portion 5 of the second part 6 may extend between the portions connected thereby around the length of SMA wire 10 on the second side of the length of SMA wire 10 along the movement axis M on which the at least one contact portion 8 of the second part 6 makes contact with the length of SMA wire 10. These alternative configurations are demonstrated in the embodiments of FIGS. 3 to 7. In FIG. 3, the at least one connection portion 5 of the second part 6 extends around the length of SMA wire 10 on the second side of the length of SMA wire 10. The plan view of FIG. 4 shows the second part 6 of the embodiment of FIG. 3 by the dotted lines. In FIG. 5, the connection portions of both the first and second parts 4, 6 extend around the length of SMA wire 10 on the first and second sides of the length of SMA wire 10 respectively. The two parts are shown in the plan view of FIG. 7.

In the embodiments of FIGS. 1, 3, and 5, the connection portions 5 are substantially straight. However, this is not essential, and the connection portions 5 may take any suitable shape. For example, as shown in FIG. 6, the connection portions 5 may be curved with a similar profile to the contact portions 8. This may be preferred when the first and second parts 4, 6 are formed from the sheet material after being assembled together, as discussed further below, because the connection portions 5 of one of the parts are formed with corresponding shapes to the contact portions 8 of the other of the parts.

Where the connection portions 5 of at least one of the first and second parts 4, 6 extend around the length of SMA wire 10 on a side of the length of SMA wire 10 along the movement axis M on which the contact portions 8 of the part make contact with the length of SMA wire 10 (as shown in FIGS. 3 and 4), the first and second parts 4, 6 can be assembled into the SMA haptic assembly 2 after the length of SMA wire 10 has been attached to one of the parts. This simplifies the manufacture of the SMA haptic assembly 2, and is discussed further below.

Where the connection portions 5 of both of the first and second parts 4, 6 extend around the length of SMA wire 10 on respective sides of the length of SMA wire 10 along the movement axis M on which the contact portions 8 of the respective parts make contact with the length of SMA wire 10 (as shown in FIG. 5), the width of the SMA actuator assembly 2 perpendicular to the movement axis M can be reduced. This is due to the reduced width of both parts (as seen in FIG. 7), because no structural support in the form of the connection portions 5 is needed outside of the width of the length of SMA wire 10. Such embodiments rely on the stiffness of the material of the first and second parts 4, 6 being sufficient that the parts are not deformed on actuation. This may require thicker material or additional stiffening elements above/below where the length of SMA wire 10 makes contact with the parts.

The at least one contact portion 8 of the first part 4 and the at least one contact portion 8 of the second part 6 are relatively positioned so as to guide the length of SMA wire 10 along a tortuous path such that the first and second parts 4, 6 are driven in opposite directions along the movement axis M on contraction of the length of SMA wire 10. The length of SMA wire 10 extends along a tortuous path in between the first and second parts 4, 6, making contact with the contact portions 8 so that the first and second parts 4, 6 are driven in opposite directions along the movement axis M on contraction of the length of SMA wire 10. The tortuous path is any path which is not a straight line between the points at which the ends of the length of SMA wire 10 are connected to the parts 4, 6. The tortuous path followed by the length of SMA wire 10 will therefore have a length which is greater than the shortest distance between the points at which the ends of the length of SMA wire 10 are connected to the parts 4, 6. The tortuosity of the tortuous path may be measured using a ratio of the length of the tortuous path to the shortest distance between the points at which the ends of the length of SMA wire 10 are connected to the first and second parts 4, 6. In some embodiments, such as shown in FIGS. 3 and 5, the length of SMA wire 10 is arranged so that when the length of SMA wire 10 contracts, the two parts 4, 6 move away from each other. In other embodiments, such as shown in FIG. 1, the two parts may move towards each other. This is caused by the overlapping of the contact portions 8 of the two parts 4, 6, such that a force is exerted on the contact portions 8 by the length of SMA wire 10 as it contracts. As mentioned above, it is not essential that both parts move during actuation. One of the first and second parts 4, 6 may be a static part that is, for example, fixed to the body of a larger device of which the SMA haptic assembly 2 is a component, and only the other of the first and second parts 4, 6 moves during actuation.

The at least one contact portion 8 of one of the first and second parts 4, 6 is formed from sheet material that is shaped to guide the path of the SMA wire 10 in contact therewith. In the embodiments shown in the figures, the contact portions 8 are curved. This reduces the thickness of the one of the first and second parts 4, 6, and thereby contributes to reducing the size of the SMA actuator assembly 2. In some embodiments, the contact portions 8 of both of the first and second parts 4, 6 are formed from sheet material. Examples of such embodiments are shown in FIGS. 1-4. Alternatively, only one of the first and second parts 4, 6 may have contact portions 8 formed from sheet material, as shown in FIG. 8. Generally, having the contact portions 8 of both the first and second parts 4, 6 formed from sheet material is preferred, as this provides the greatest reduction in the size of the SMA haptic assembly 2.

In some embodiments, the at least one contact portion 8 and the at least one connection portion 5 are integrally formed from said sheet material. In some embodiments, the support portions 17 are also integrally formed from said sheet material. In other embodiments, the support portions 17 may be formed from another material and joined to the remainder of the part during assembly. In embodiments where one or both of the first and second parts 4, 6 comprise plural contact portions 8, the plural contact portions 8 and the at least one connection portion 5 may be integrally formed from said sheet material.

In some embodiments, different types of sheet material may be used for the first and second parts 4, 6 or for different portions of the first and second parts 4, 6. For example, one metal may be used for the contact portions 8 and another for the support portions 17. This can allow the material of each portion or part to be chosen to match the required properties for that part to perform optimally. In other embodiments, the first and second parts 4, 6 and/or the portions of the first and second parts 4, 6 may all be formed from the same type of sheet material. This has the advantage of simplified manufacture of the SMA haptic assembly 2.

In some embodiments, such as shown in FIGS. 9 and 10, the first and second parts 4, 6 may be integrally formed from a single sheet of material. This has the advantage that the entire assembly can be manufactured from a single piece of sheet material, and the alignment of the first and second parts 4, 6 during assembly can be simplified. In other embodiments, the first and second parts 4, 6 may be formed separately from different sheets of material.

Figure 24:
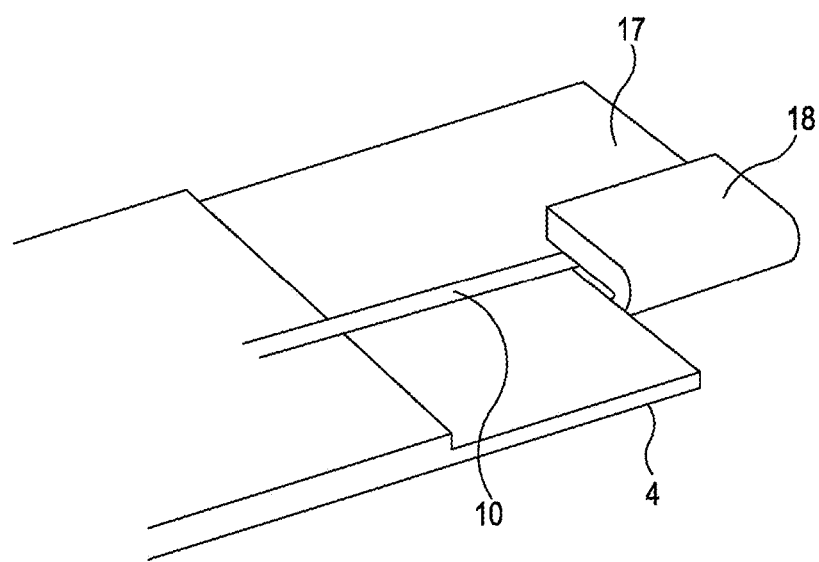
FIG. 24 is a perspective view of a part in which the connection element is a crimp element formed integrally from the sheet material.

In embodiments where the one of the first and second parts 4, 6 further comprises a support portion 17 to which an end of the length of SMA wire 10 is connected, the end of the length of SMA wire 10 may be connected to the support portion 17 by a connection element 18 that holds the SMA wire. Any suitable means or wire attachment device may be used as the connection element 18 to hold the SMA wire. For example, the connection element 18 may comprise an adhesive, where the SMA wire is set into the adhesive before curing the adhesive. Alternatively, the connection element 18 may comprise a hook or dowel pin around which the length of SMA wire 10 is secured. In some embodiments, the connection element is a crimp element. The crimp element may be fixed to either of the first and second parts 4, 6. The crimp elements crimp the ends of the length of SMA wire 10. Crimping may be achieved by compressing the SMA wire between two pieces of deformable material or by folding a single piece of deformable material. Using a metal crimp element may be desirable, in particular where the crimp element is used to make electrical connection to the length of SMA wire 10 as well as fixing the length of SMA wire 10 to the first and second parts 4, 6. It is not necessary for both connection elements 18 to be identical, although this may be preferred. For example, one of the connection elements 18 may comprise a crimp element, and the other of the connection elements 18 may comprise a hook, dowel pin, or adhesive, as described above. In the embodiment shown in FIG. 21, the crimp element is a separate element that is joined to the support portion 17 during assembly. However, in some embodiments, the crimp element is integrally formed from said sheet material, as shown in FIG. 24. This may be advantageous in reducing component count and therefore the complexity of assembling the SMA haptic assembly 2.

As mentioned above, in some embodiments, the at least one contact portion 8 of the other of the first and second parts 4, 6 is also formed from sheet material that is shaped to guide the path of the SMA wire in contact therewith. In the embodiments shown in the figures, the at least one contact portion 8 of the other of the first and second parts 4, 6 is also curved. As shown in the figures and discussed above, different embodiments of the features of the first and second parts 4, 6 may be combined in various ways.

In some embodiments where the at least one contact portion 8 of the other of the first and second parts 4, 6 is also formed from sheet material, the one of the first and second parts 4, 6 further comprises support portions 17 to which the ends of the length of SMA wire 10 are connected and at least one connection portion 5 which connects the at least one contact portion 8 and the support portions 17, the at least one contact portion 8, the at least one connection portion 5 and the support portions 17 of the first part 4 are integrally formed from said sheet material, and the at least one connection portion 5 of the first part 4 extends between the at least one contact portions 8 and the support portions 17 along a lateral side of the length of SMA wire 10 in a direction normal to the movement axis. Examples of such embodiments are shown in FIGS. 1, 2, and 3.

In some embodiments where the at least one contact portion 8 of the other of the first and second parts 4, 6 is also formed from sheet material, the one of the first and second parts 4, 6 further comprises support portions 17 to which the ends of the length of SMA wire 10 are connected and at least one connection portion 5 which connects the at least one contact portion 8 and the support portions 17, the at least one contact portion 8, the at least one connection portion 5 and the support portions 17 of the first part 4 are integrally formed from said sheet material, and the at least one connection portion 5 of the first part 4 extends between the portions connected thereby around the length of SMA wire 10 on the first side of the length of SMA wire 10 along the movement axis on which at least one contact portion 8 makes contact with the length of SMA wire 10. An example of such an embodiment is shown in FIG. 5.

In some embodiments where the at least one contact portion 8 of the other of the first and second parts 4, 6 is also formed from sheet material, the other of the first and second parts 4, 6 comprises plural contact portions 8 and at least one connection portion 5 connecting the contact portions 8 together, the plural contact portions 8 and the at least one connection portion 5 of the second part 6 are integrally formed from said sheet material, and the at least one connection portion 5 of the second part 6 extends between the contact portions 8 along a lateral side of the length of SMA wire 10 in a direction normal to the movement axis. An example of such an embodiment is shown in FIG. 1.

In some embodiments where the at least one contact portion 8 of the other of the first and second parts 4, 6 is also formed from sheet material, the other of the first and second parts 4, 6 comprises plural contact portions 8 and at least one connection portion 5 connecting the contact portions 8 together, the plural contact portions 8 and the at least one connection portion 5 of the second part 6 are integrally formed from said sheet material, and the at least one connection portion 5 of the second part 6 extends between the contact portions 8 around the length of SMA wire 10 on the second side of the length of SMA wire 10 along the movement axis M on which at least one contact portion 8 makes contact with the length of SMA wire 10. Examples of these embodiments are shown in FIGS. 3 and 4.

The direction of relative movement along the movement axis M shown in the figures is the expected motion produced by the resultant force from the contraction of the length of SMA wire 10 given an ideal loading condition. In other loading conditions, it is expected that some other constraint may be required to ensure the relative motion of the first and second parts 4, 6 is in the desired direction. Therefore, the SMA haptic assembly 2 may comprise a suspension system which holds the first and second parts 4, 6 relative to one another and allows them to move along the movement axis M. The suspension system provides any required constraint on the relative motion as described above, and could be any form of kinematic constraint, for example plain bearings, roller bearings, bushing on pin, or any other suitable arrangement. The suspension system may permit movement of the first and second parts 4, 6 relative to one another along the movement axis M, while restricting or preventing relative movement of the first and second parts 4, 6 in the plane perpendicular to the movement axis M. The suspension system (or some other arrangement) may also restrict or prevent relative rotation of the first and second parts 4, 6, for example due to an off-centre force applied to the SMA haptic assembly 2 by a user.

The suspension system may integrate the constraint on the relative movement of the first and second parts 4, 6 into the assembly using a flexure arrangement. In some embodiments, the SMA haptic assembly 2 further comprises at least one flexure 9, extending from the one of the first and second parts 4, 6 to the other of the first and second parts 4, 6 and connected thereto, the flexure 9 being arranged to guide relative movement of the first and second parts 4, 6 along the movement axis M.

Figure 11:
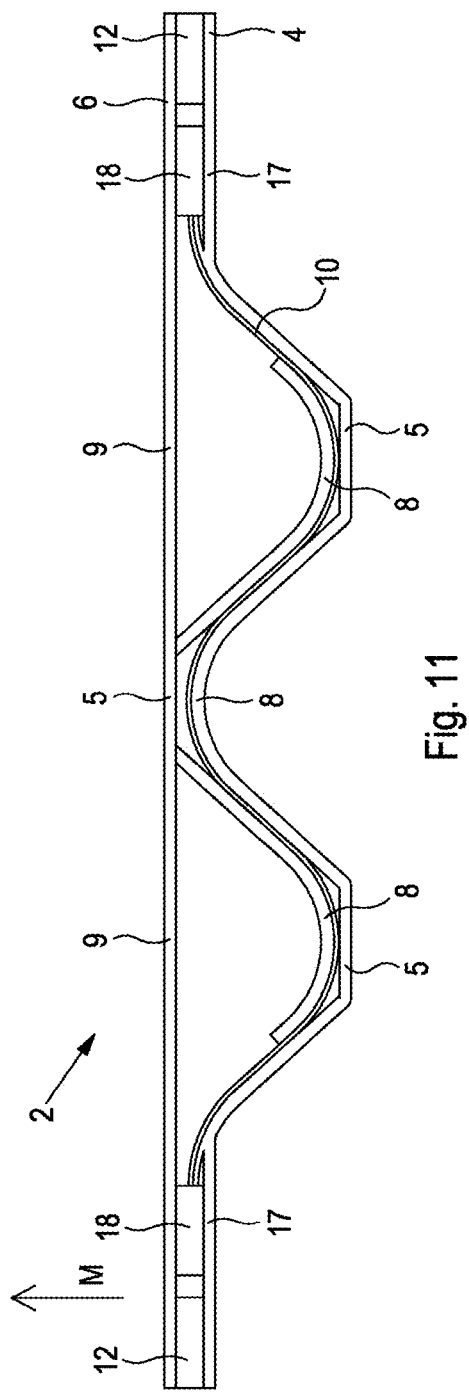
FIG. 11 is a side view of an SMA haptic assembly comprising flexures.
Figure 12:
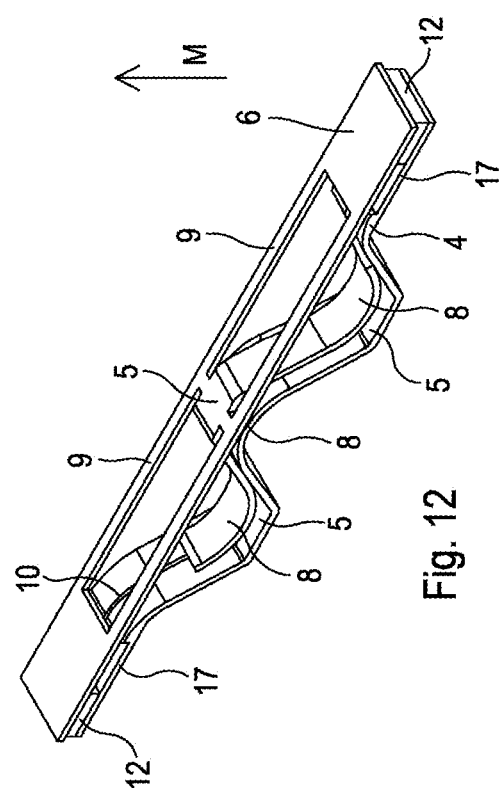
FIG. 12 is a perspective view of the SMA haptic assembly of FIG. 11.

An embodiment of a flexure arrangement is shown in FIGS. 11 and 12. The embodiment of FIGS. 11 and 12 is an example of an embodiment in which the one of the first and second parts 4, 6 comprises plural contact portions 8 and further comprises at least one connection portion 5 connecting the contact portions 8 together, and the or each flexure 9 extends from the one of the first and second parts 4, 6 to the other of the first and second parts 4, 6 along a lateral side in a direction normal to the movement axis M. In FIGS. 11 and 12, flexures 9 are attached to the outside edge of the second part 6 on lateral sides of the length of SMA wire 10 in a direction normal to the movement axis M. The ends of the flexures 9 are connected to the first part 4 to control the relative motion between the two parts. The connecting of the ends of the flexures 9 to the could be achieved using, for example, gluing or welding, potentially via a spacer or carrier component. In the embodiments of FIGS. 11 and 12, the flexures 9 are formed from the sheet material. However, in some embodiments, the flexures 9 may be separate components connected to the first and second parts 4, 6 during assembly of the SMA haptic assembly 2.

In some embodiments, the SMA haptic assembly 2 includes an arrangement (e.g. a resilient element such as a spring) to provides a force ("a return force") urging the first and second parts 4, 6 together along the movement axis M such that, when the power to the length of SMA wire 10 is reduced or stopped, the length of SMA wire 10 expands as it cools and the first and second parts 4, 6 move back e.g. towards the resting position. In embodiments where the SMA haptic assembly 2 comprises one or more flexures 9, the flexures 9 may provide the return force. In other embodiments, the SMA haptic assembly 2 does not include such an arrangement, in which case the return force can be provided by a user (e.g. by a finger press) on an area of the electronic device to which the SMA haptic assembly 2 is coupled.

In some embodiments, the one of the first and second parts 4, 6 further comprises at least one endstop 12 integrally formed from the sheet material and providing a limit on relative movement of the first and second parts 4, 6. In some embodiments, the endstop 12 provides a limit on the relative movement of the first and second parts 4, 6 in an opposite direction to that in which the first and second parts 4, 6 are driven on contraction of the length of SMA wire 10. End stops can be provided in order to protect the length of SMA wire 10 from over-extension that may result if the first and second parts 4, 6 are moved too far in one direction from the resting position, for example by a force exerted on the SMA haptic assembly by a user. The endstops 12 can be easily integrated into the components formed from sheet material. FIGS. 11 and 12 show embodiments comprising endstops 12 attached to one of the first and second parts 4, 6.

Figure 16:
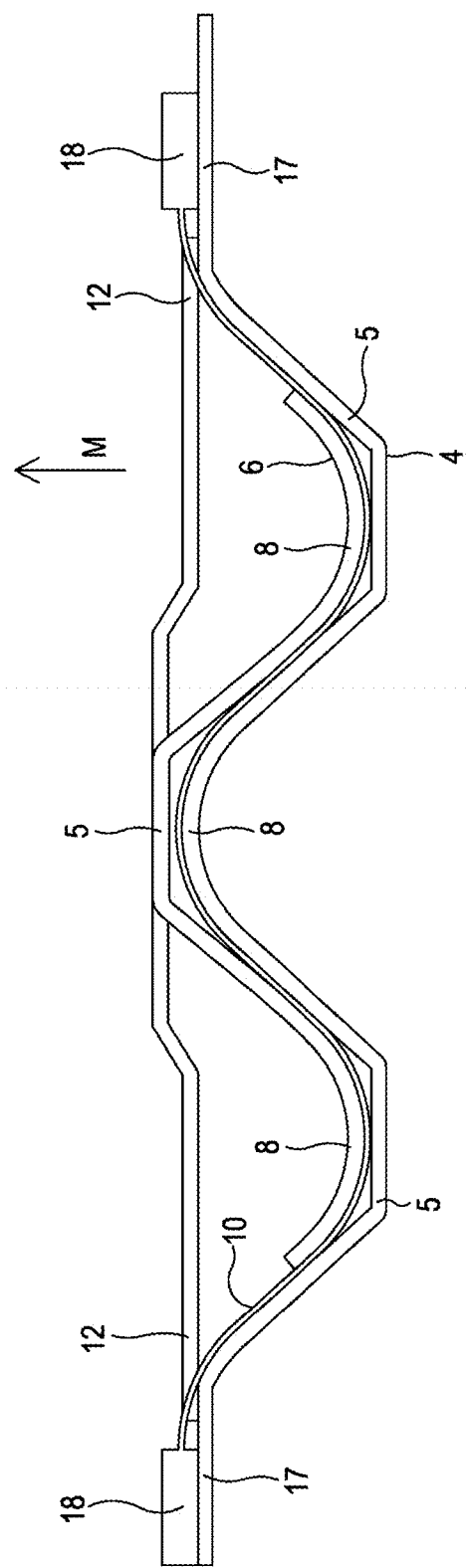
FIG. 16 is a side view of an SMA haptic assembly having endstops integrally formed from the sheet material.

Alternatively or additionally, one of the first and second parts 4, 6 could be extended to function as an endstop 12 on the other of the first and second parts 4, 6. In some embodiments, the one of the first and second parts 4, 6 comprises plural contact portions 8 and further comprises at least one connection portion 5 connecting the contact portions 8 together, and the endstop 12 extends from the at least one connection portion 5 to a position where it provides a limit on relative movement of the first and second parts 4, 6 by contact with the other of the first and second parts 4, 6. An example of such an implementation of the endstops 12 is shown in FIG. 16.

In some embodiments, the at least one connection portion 5 provides a limit on relative movement of the first and second parts 4, 6 in an opposite direction to that in which the first and second parts 4, 6 are driven on contraction of the length of SMA wire 10 by contact with the length of SMA wire 10. This represents an alternative or additional way to prevent the first and second parts 4, 6 from moving too close together, relying on "clashing" between the first and second parts 4, 6. An example of such an embodiment is shown in FIG. 5, where contact between the contact portion 8 of the second part 6, the length of SMA wire 10, and the connection portion 5 of the first part 4 prevents the first and second parts 4, 6 from moving past the resting position (i.e. a position in which the length of SMA wire 10 is not contracted and the SMA haptic assembly 2 is not actuated) in an opposite direction to that in which the first and second parts 4, 6 are driven on contraction of the length of SMA wire 10.

In some embodiments, the sheet material is metal. The metal could be any standard sheet metal material, for example, aluminium, steel, stainless steel, copper, or any other suitable metal. Stainless steel may be preferred because it may have benefits in relation to cost, physical properties and chemical properties (oxidation) compared to more esoteric metals.

Using metal sheet material for the first and second parts 4, 6 has the challenge that it could present a short path for an electrical current that is intended to pass through the length of SMA wire 10. Therefore, where the sheet material is metal, the points at which the length of SMA wire 10 is connected to the first or second parts 4, 6 need to be electrically isolated from each other. The length of SMA wire 10 may also need to be electrically isolated from the sheet metal material components of the SMA haptic assembly 2. This ensures that any current used to actuate the length of wire 10 passes through the entire length of SMA wire 10 and there is no short circuit through any of the other components of the SMA haptic assembly 2.

Electrical isolation between the points at which the length of SMA wire 10 is connected to the first or second parts 4, 6 could be achieved by splitting the part to which the length of SMA wire 10 is connected into two. Therefore, in some embodiments, the sheet material has at least one gap that electrically disconnects the two support portions 17. An example of such an embodiment is shown in FIG. 14, where a gap 40 exists in the sheet material of the first part 4 between the support portion 17 and the contact portion 8. This has the advantage that when connection elements 18 are used to connect the ends of the length of SMA wire 10 to the support portions 17, the connection elements could be welded to the support portions 17. Alternatively, the connection elements 18, for example crimp elements, could be formed out of the same sheet of material as the part to which the length of SMA wire 10 is connected. Where a gap 40 is provided in the sheet material, an additional insulating component may be required to hold the two sections of the sheet material relative to each other. Therefore, in some embodiments, the sheet of material is connected to a body of electrically insulating material 15. This is also shown in the embodiment of FIG. 14.

Alternatively or additionally, electrical isolation between the points at which the length of SMA wire 10 is connected to the first or second parts 4, 6 could be achieved by insulating one of the connection elements 18 from the first or second part 4, 6 to which they are attached. In some embodiments, the SMA haptic assembly 2 further comprises electrically insulating material 13 provided between the connection element 18 and the support portion 17. An example of such an embodiment is shown in FIG. 15. A further advantage of these embodiments is that the first or second part 4, 6 to which the connection elements 18 are connected can be used to electrically connect to the connection element 18 holding the other of the ends of the length of SMA wire 10. This means the electrical connections to both ends of the length of SMA wire 10 can be provided at the same end of the SMA haptic assembly 2, which may simplify the integration of the SMA haptic assembly 2 into a larger device. Alternatively, both of the connection elements 18 could be insulated from the one of the first and second parts 4, 6 to which they are attached.

One approach to preventing the metal sheet material from shorting out the length of SMA wire 10 is to provide additional insulating material to insulate the metal sheet material from the length of SMA wire 10. In some embodiments, the SMA haptic assembly 2 further comprises insulating material 11 that electrically insulates the at least one contact portion 8 of the one of the first and second parts 4, 6 from the length of SMA wire 10. A thin layer of insulating material could be placed between each of the metal components of the SMA haptic assembly 2 and the length of SMA wire 10. The insulating layers could be loose within the SMA haptic assembly 2, attached to the length of SMA wire 10, attached to another insulating layer capturing the length of SMA wire 10, or attached to the first or second parts 4, 6. This insulating material/layer could be provided in several different ways.

Figure 13:
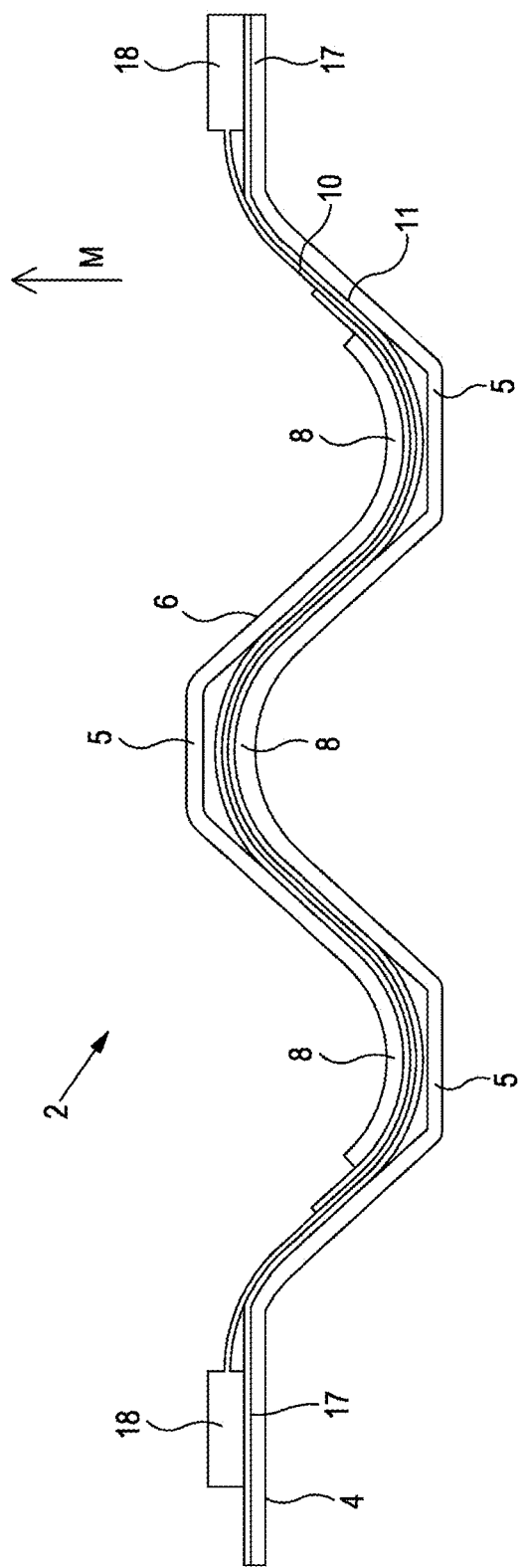
FIG. 13 is a side view of an SMA haptic assembly where the length of SMA wire has an electrically insulating coating.

In some embodiments, the length of SMA wire 10 and/or the at least one contact portion 8 of the one of the first and second parts 4, 6 is coated with said insulating material 11. A variety of coatings could be applied to the first and/or second parts 4, 6 to insulate them from the length of SMA wire 10. Examples include, but are not limited to, conformal coatings, spray coatings, dip coatings, plasma-deposited coatings, vapour deposited coatings, and anodising. Alternatively or additionally, as shown in FIG. 13, a coated length of SMA wire 10 could be used, and would allow the first and second parts 4, 6 to be formed from bare sheet metal material.

Embodiments of the present invention also provide advantages in manufacture of the SMA haptic assembly 2. In some embodiments, there is provided a method of manufacture of an SMA haptic assembly 2 according to any one of the embodiments described above. The simplest method of assembly is to form the first and second parts 4, 6, at least one of which is formed from a sheet material, and to then assemble the first and second parts 4, 6 with the length of SMA wire 10 to make the SMA haptic assembly 2. FIGS. 17 and 18 show intermediate stages of such a method of manufacture of an SMA haptic assembly 2, after forming of the first and second parts 4, 6 but before the first and second parts 4, 6 are assembled together with the length of SMA wire 10. In the example of FIGS. 17 and 18, the SMA haptic assembly 2 is one in which the first and second parts 4, 6 are integrally formed from sheet material. However, this method of manufacture can also be used to assemble SMA haptic assemblies where the first and second parts 4, 6 are formed separately. Expected manufacturing methods for producing whichever of the first and second parts 4, 6 from sheet material would be stamping or chemical etching followed by forming in a forming tool. If either of the first and second parts 4, 6 are not formed from sheet material, they may instead be manufactured from materials such as plastic or resin by methods such as injection moulding.

Figure 20:
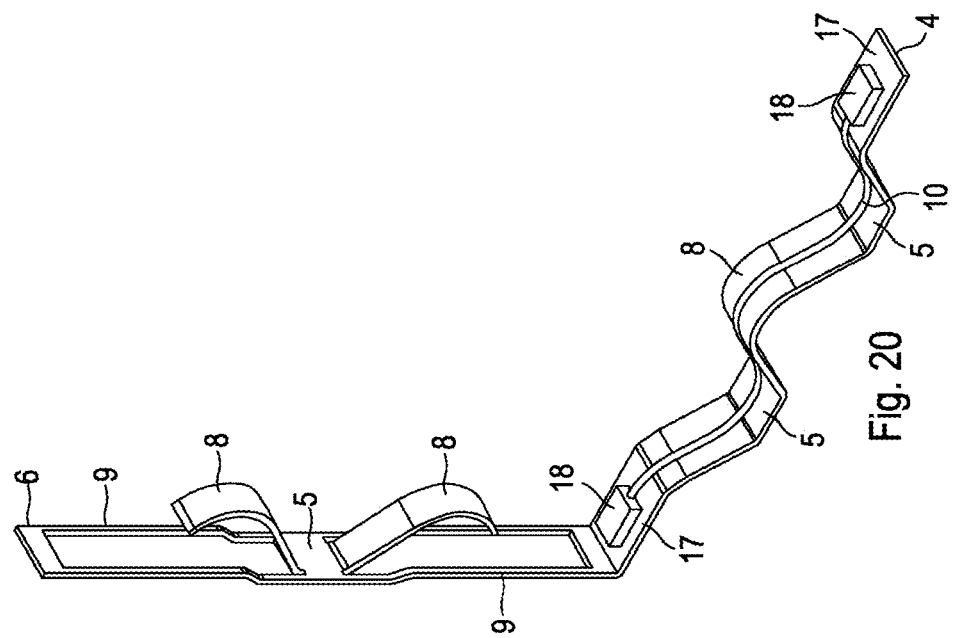
FIG. 20 is a further perspective view showing an intermediate step of a method of manufacturing an SMA haptic assembly, wherein the first and second parts are integrally formed from sheet material shaped with the length of SMA wire in situ.
Figure 19:
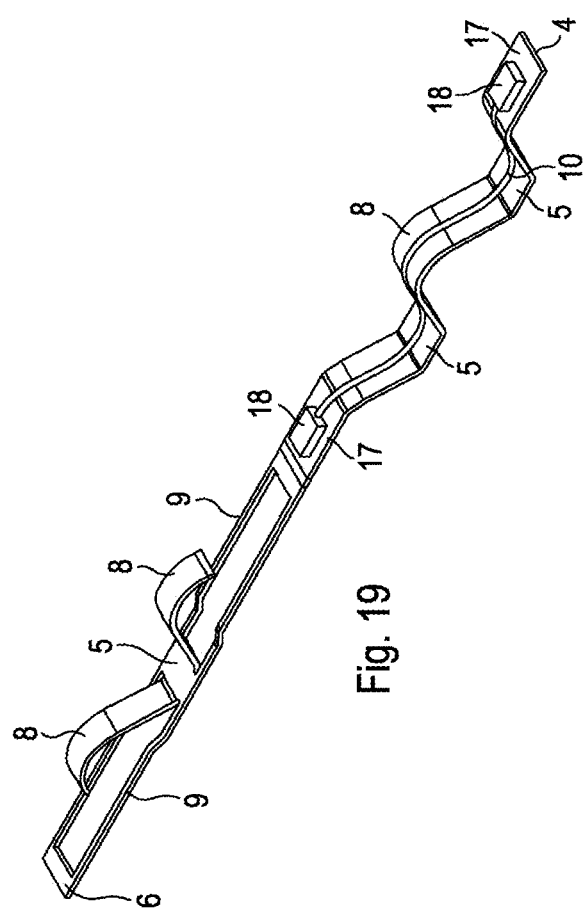
FIG. 19 is a perspective view showing an intermediate step of a method of manufacturing an SMA haptic assembly, wherein the first and second parts are integrally formed from sheet material shaped with the length of SMA wire in situ.

In some embodiments, the method of manufacture of the SMA haptic assembly 2 comprises connecting the length of SMA wire 10 to the first part 4, and assembling the second part 6 with the first part 4. As discussed above, where the connection portions 5 of at least one of the first and second parts 4, 6 extend around the length of SMA wire 10 on a side of the length of SMA wire 10 along the movement axis M on which the contact portions 8 of the part make contact with the length of SMA wire 10 (as shown in FIGS. 3 and 4), the first and second parts 4, 6 can be assembled into the SMA haptic assembly 2 after the length of SMA wire 10 has been attached to the first part 4. FIGS. 19 and 20 show intermediate stages of such a method of manufacture of an SMA haptic assembly 2, after the length of SMA wire 10 has been connected to the first part 4, but before the two parts are assembled together. In the example of FIGS. 19 and 20, the SMA haptic assembly 2 is one in which the first and second parts 4, 6 are integrally formed from sheet material. However, this method of manufacture can also be used to assemble SMA haptic assemblies where the first and second parts 4, 6 are formed separately. This has the advantage that the second part 6 can be assembled into the first part 4 after the length of SMA wire 10 has been attached to the first part 4. Examples of other embodiments where this method of manufacture is possible include those shown in FIGS. 3 to 5.

Where the connection portions 5 of both the first and second parts 4, 6 extend between the portions connected thereby along a lateral side of the length of SMA wire 10 in a direction normal to the movement axis M, then the length of SMA wire 10 will need to be threaded through the first and second parts 4, 6 to lie in the correct position relative to the contact portions 8 of both parts. Therefore, in such embodiments, the length of SMA wire 10 can only be connected to the first part 4 during or after assembling the first and second parts 4, 6 together.

Figure 21:
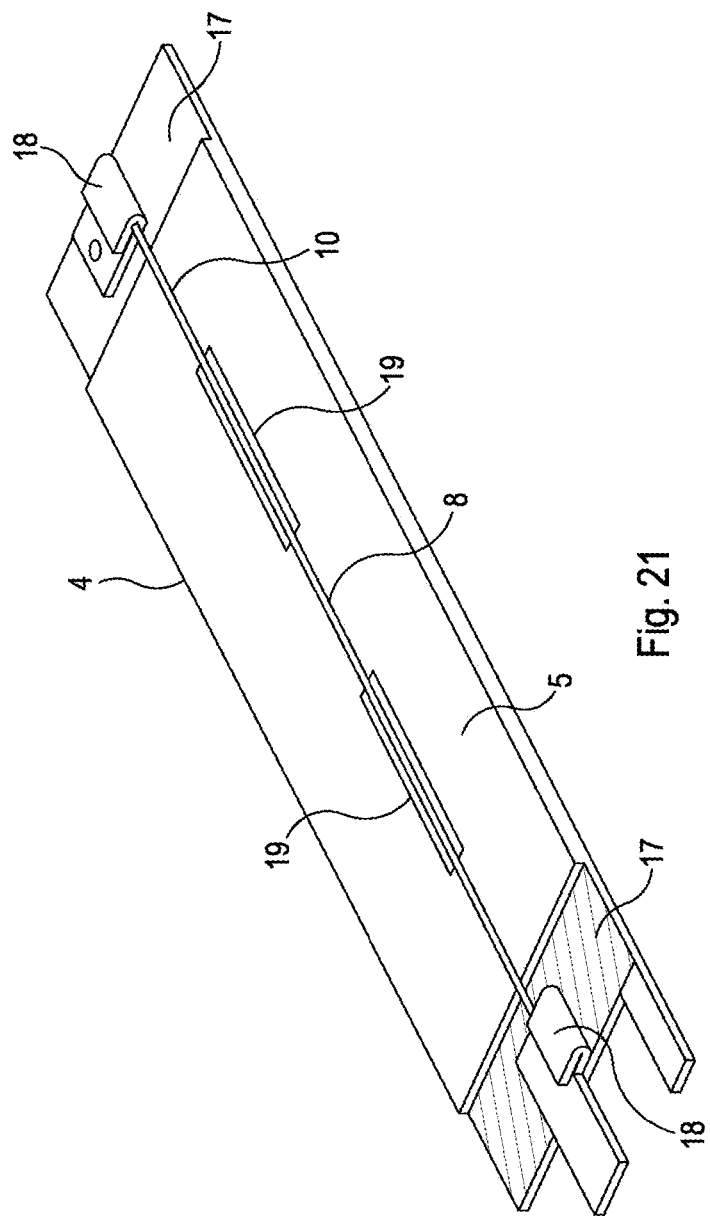
FIG. 21 is a perspective view showing an intermediate step of a method of manufacturing an SMA haptic assembly, wherein the sheet material is shaped with the length of SMA wire in situ.

In some embodiments, the method of manufacture of the SMA haptic assembly 2 comprises providing a planar form of the first part 4 made from sheet material, connecting the length of SMA wire 10 to the first part 4, shaping the sheet material to form the first part 4, and assembling the second part 6 with the first part 4. In such embodiments of the method of manufacture, the sheet material part is formed after the SMA haptic assembly 2 is assembled. This has the advantage of allowing the length of SMA wire 10 to be connected to the first part 4 when it is flat. An example of an intermediate step of such an embodiment of the method is shown in FIG. 21, where the length of SMA wire 10 has been connected to the first part 4 while it is still flat. This embodiment also demonstrates an embodiment in which electrically insulating material is provided between the connection element 18 and the support portion 17. The left-hand crimp is electrically insulated from the first part 4 while the right-hand crimp is welded to the first part 4.

Figure 22:
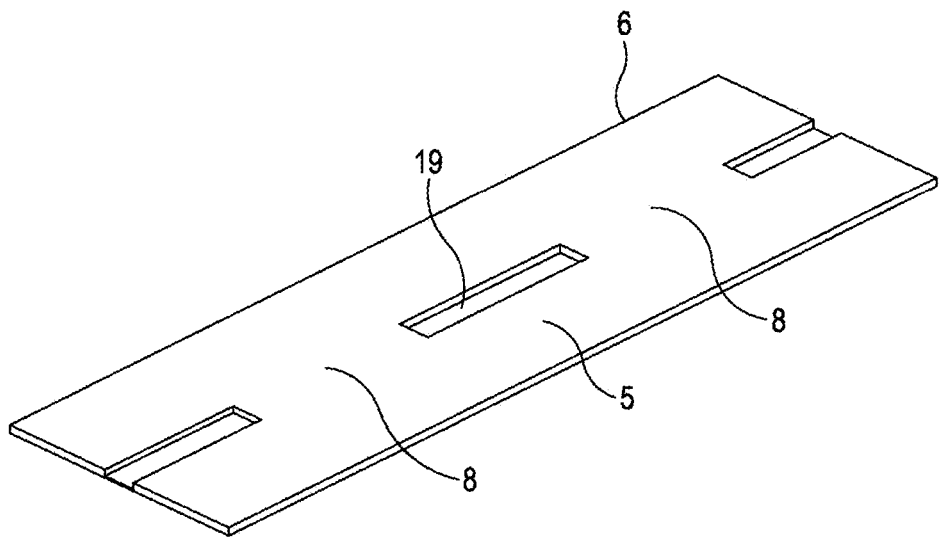
FIG. 22 is a perspective view of a planar form of a part with two contact portions and a connection portion and provided with recesses to accommodate the length of SMA wire.

In some embodiments, the method of manufacture of an SMA haptic assembly 2 comprises providing a planar form of the first part 4 made from sheet material, connecting the length of SMA wire 10 to the first part 4, assembling a planar form of the second part 6 made from sheet material with the planar form of the first part 4, and shaping the sheet material to form the first and second parts 4, 6. This embodiment has the advantage discussed above that the length of SAM wire 10 can be connected to the first part 4 while the first part 4 is flat, thereby simplifying the connection. It has the further advantage that the shaping of the first and second parts 4, 6 is performed with the length of SMA wire in situ, thereby ensuring that the length of SMA wire 10 and the shapes of the first and second parts 4, 6 correctly match. An example of a planar form of the second part 6 for use in such a method is shown in FIG. 22. Such a method of manufacture is possible where the at least one connection portion 5 of the first part 4 extends between the portions connected thereby around the length of SMA wire 10 on the first side of the length of SMA wire 10 along the movement axis M on which at least one contact portion 8 makes contact with the length of SMA wire 10, and the at least one connection portion 5 of the second part 6 extends between the contact portions 8 around the length of SMA wire 10 on the second side of the length of SMA wire 10 along the movement axis M on which at least one contact portion 8 makes contact with the length of SMA wire 10.

Figure 23:
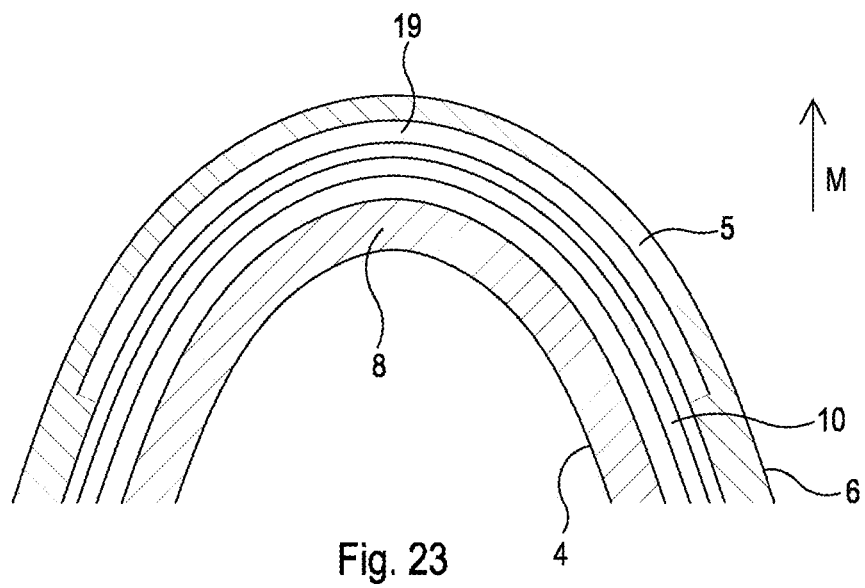
FIG. 23 is an expanded view of a part such as those shown in FIGS. 21 and 22 after shaping of the planar form of the part, showing the recess accommodating the length of SMA wire.

In some embodiments of the method of manufacture that comprise shaping the sheet material to form the first and second parts 4, 6 after assembling the parts together, assembling the planar forms comprises urging the planar forms into contact with each other, wherein the planar forms are provided with recesses 19 to accommodate the length of SMA wire 10 when the planar forms of the first and second parts 4, 6 are in contact with each other. The planar forms of the first and second parts shown in FIGS. 21 and 22 are example of embodiments with such recesses. As shown in the expanded view of FIG. 23, the length of SMA wire 10 sits inside the recesses 19, so it is not crushed between the first and second parts 4, 6 when they are formed to take on their final shapes. The recesses could be provided by half-etched regions of the planar form of the first and second parts 4, 6, or could be provided by other methods such as milling of the surface of the planar forms.

The invention claimed is:

1. A shape memory alloy (SMA) haptic assembly comprising:
a first part and a second part that are movable relative to each other along a movement axis; and
a length of SMA wire, each of a first end of the length of SMA wire and a second end of the SMA wire being connected to the first part or the second part, wherein:
the first part comprises at least one contact portion making contact with the length of SMA wire on a first side of the length of SMA wire along the movement axis, the second part comprises at least one contact portion making contact with the length of SMA wire on a second side of the length of SMA wire along the movement axis, opposite to the first side, the at least one contact portion of the first part and the at least one contact portion of the second part being relatively positioned to guide the length of SMA wire along a tortuous path such that the first part and the second part are driven in opposite directions along the movement axis on contraction of the length of SMA wire, and
the at least one contact portion of one of the first part and the second part (i) is shaped to guide the path of the SMA wire in contact therewith, (ii) has a constant thickness along the path of the SMA wire, the thickness measured between a side of the at least one contact portion making contact with the length of SMA wire and an opposite side of the at least one contact portion, and (iii) is formed from a sheet material.

2. The SMA haptic assembly according to claim 1, wherein:
the one of the first part and the second part further comprises:
a plurality of support portions to which the ends of the length of SMA wire are connected; and
at least one connection portion which connects the at least one contact portion of the one of the first part and the second part and the support portions; and
the at least one contact portion of the one of the first part and the second part and the at least one connection portion of the one of the first part and the second part are integrally formed from said sheet material.

3. The SMA haptic assembly according to claim 2, wherein:
the support portions are also integrally formed from said sheet material; and
the sheet material has at least one gap that electrically disconnects the support portions.

4. The SMA haptic assembly according to claim 2, wherein the at least one connection portion extends between portions connected thereby along a lateral side of the length of SMA wire in a direction normal to the movement axis, wherein the connection portion is planar.

5. The SMA haptic assembly according to claim 2, wherein the at least one connection portion extends between portions connected thereby around the length of SMA wire on the first side of the length of SMA wire along the movement axis on which at least one contact portion of the at least one contact portion of the first part or of the at least one contact portion of the second part makes contact with the length of SMA wire, wherein the at least one connection portion provides a limit on relative movement of the first part and the second part in an opposite direction to that in which the first part and the second part are driven on contraction of the length of SMA wire by contact with the length of SMA wire.

6. The SMA haptic assembly according to claim 1, wherein the one of the first part and the second part comprises a plurality of contact portions and at least one connection portion connecting the plurality of contact portions of the one of the first part and the second part together, wherein the plurality of contact portions and the at least one connection portion are integrally formed from said sheet material.

7. The SMA haptic assembly according to claim 1, further comprising at least one flexure extending from the one of the first part and the second part to the other of the first part and the second part and connected thereto, the flexure being arranged to guide relative movement of the first part and the second part along the movement axis, wherein the flexure is integrally formed from the sheet material.

8. The SMA haptic assembly according to claim 7, wherein
the one of the first part and the second part comprises a plurality of contact portions and further comprises at least one connection portion connecting the plurality of contact portions of the one of the first part and the second part together, and
each of the at least one flexures extends from the one of the first part and the second part to the other of the first part and the second part along a lateral side in a direction normal to the movement axis.

9. The SMA haptic assembly according to claim 1, wherein the one of the first part and the second part further comprises at least one endstop integrally formed from the sheet material and providing a limit on relative movement of the first part and the second part, wherein the endstop provides the limit on relative movement of first part and the second part in an opposite direction to that in which the first part and the second part are driven on contraction of the length of SMA wire.

10. The SMA haptic assembly according to claim 9, wherein
the one of the first part and the second part comprises a plurality of contact portions and further comprises at least one connection portion connecting the plurality of contact portions of the one of the first part and the second part together, and
the endstop extends from the at least one connection portion to a position where the at least one connection portion provides the limit on relative movement of the one of the first part and the second part by contact with the other of the first part and the second part.

11. The SMA haptic assembly according to claim 1, wherein the sheet material is metal.

12. The SMA haptic assembly according to claim 11, further comprising an insulating material that electrically insulates the at least one contact portion of the one of the first part and the second part from the length of SMA wire, wherein the length of SMA wire and/or the at least one contact portion of the one of the first part and the second part is coated with said insulating material.

13. The SMA haptic assembly according to claim 1, wherein the one of the first part and the second part further comprises a support portion to which an end of the length of SMA wire is connected by a connection element that holds the SMA wire, wherein the connection element is a crimp element, wherein the crimp element is integrally formed from said sheet material.

14. The SMA haptic assembly according to claim 13, further comprising electrically insulating material provided between the connection element and the support portion.

15. The SMA haptic assembly according to claim 1, wherein the first part and the second part are integrally formed from a single sheet of the sheet material.

16. The SMA haptic assembly according to claim 1, wherein the at least one contact portion of the other of the first part and the second part has a constant thickness and is also formed from the sheet material that is shaped to guide the path of the SMA wire in contact therewith, optionally wherein the at least one contact portion of the other of the first part and the second part is curved.

17. The SMA haptic assembly according to claim 16, wherein:
the one of the first part and the second part further comprises a plurality of support portions to which the ends of the length of SMA wire are connected and at least one connection portion which connects the at least one contact portion of the one of the first part and the second part and the support portions,
the at least one contact portion of the first part, the at least one connection portion of the first part, and the support portions of the first part are integrally formed from said sheet material, and
the at least one connection portion of the first part extends between the at least one contact portion of the first part and the support portions of the first part along a lateral side of the length of SMA wire in a direction normal to the movement axis,
wherein the other of the first part and the second part comprises a plurality of contact portions and at least one connection portion connecting the contact portions of the other of the first part and the second part together,
the plurality of contact portions of the second part and the at least one connection portion of the second part are integrally formed from said sheet material, and
the at least one connection portion of the second part extends between the contact portions of the second part along the lateral side of the length of SMA wire in the direction normal to the movement axis.

18. The SMA haptic assembly according to claim 16, wherein:
the one of the first part and the second part further comprises a plurality of support portions to which the ends of the length of SMA wire are connected and at least one connection portion which connects the at least one contact portion of the one of the first part and the second part and the support portions,
the at least one contact portion of the first part, the at least one connection portion of the first part, and the support portions of the first part are integrally formed from said sheet material, and
the at least one connection portion of the first part extends between portions connected thereby around the length of SMA wire on the first side of the length of SMA wire along the movement axis on which at least one contact portion of the at least one contact portion of the first part makes contact with the length of SMA wire,
wherein the other of the first part and the second part comprises a plurality of [the] contact portions and at least one connection portion connecting the contact portions of the other of the first part and the second part together,
the plurality of contact portions of the second part and the at least one connection portion of the second part are integrally formed from said sheet material, and
the at least one connection portion of the second part extends between the contact portions of the second part around the length of SMA wire on the second side of the length of SMA wire along the movement axis on which at least one contact portion of the contact portions of the second part makes contact with the length of SMA wire.

19. A method of manufacture of the SMA haptic assembly according to claim 18, comprising:

providing a planar form of the first part made from the sheet material;

connecting the length of SMA wire to the first part;

assembling a planar form of the second part made from the sheet material with the planar form of the first part; and shaping the sheet material to form the first part and the second part, wherein assembling the planar forms comprises urging the planar forms into contact with each other, wherein the planar forms are provided with recesses to accommodate the length of SMA wire when the planar form of the first part and the second part are in contact with each other.

20. A method of manufacture of the SMA haptic assembly according to claim 1, comprising shaping the sheet material to form the first part and the second part by at least one of stamping or chemical etching.

\* \* \* \* \*